(12) United States Patent
Ju

(10) Patent No.: US 8,624,423 B2
(45) Date of Patent: Jan. 7, 2014

(54) BLADE CONFIGURATIONS FOR WIND POWER CONVERTING APPARATUS

(76) Inventor: Young-Dae Ju, Kangwon-do (KR)

( * ) Notice: Subject to any disclaimer, the term of this patent is extended or adjusted under 35 U.S.C. 154(b) by 0 days.

(21) Appl. No.: 13/377,830

(22) PCT Filed: Jun. 13, 2010

(86) PCT No.: PCT/KR2010/003794
§ 371 (c)(1),
(2), (4) Date: Dec. 13, 2011

(87) PCT Pub. No.: WO2010/143921
PCT Pub. Date: Dec. 16, 2010

(65) Prior Publication Data
US 2012/0080886 A1    Apr. 5, 2012

(30) Foreign Application Priority Data

Jun. 13, 2009  (KR) .......... 10-2009-0052590
May 28, 2010  (KR) .......... 10-2010-0050631

(51) Int. Cl.
*F03D 3/04* (2006.01)
(52) U.S. Cl.
USPC ............................. 290/55; 290/44
(58) Field of Classification Search
USPC ........... 290/55, 44; 415/4.2, 4.4, 208.1, 208.2
See application file for complete search history.

(56) References Cited

U.S. PATENT DOCUMENTS

| 4,234,289 A * | 11/1980 | Lebost ............... 415/4.4 |
| 6,870,280 B2 * | 3/2005 | Pechler ............... 290/55 |
| 7,112,034 B2 * | 9/2006 | Bezemer ............. 415/3.1 |
| 7,880,322 B2 * | 2/2011 | Cumings et al. ....... 290/54 |
| 2009/0003999 A1 * | 1/2009 | Whitworth et al. ..... 415/208.1 |
| 2011/0133471 A1 * | 6/2011 | Chung ................. 290/55 |

FOREIGN PATENT DOCUMENTS

| KR | 10-2000-0067567 | 11/2000 |
| KR | 10-2006-013808 | 11/2006 |
| KR | 10-2010-0012645 | 2/2010 |

* cited by examiner

*Primary Examiner* — Vanessa Girardi
(74) *Attorney, Agent, or Firm* — KED & Associates, LLP

(57) ABSTRACT

A wind power converting apparatus that includes a rotor unit. The rotor unit includes a rotary blade assembly and a cover. The rotary blade assembly has a rotary blade disposed in the longitudinal direction of the rotary shaft, and is rotated by the wind from the outside. The cover blocks a headwind, which blows opposite to the direction in which the rotary blade assembly is rotated, from being introduced to the rotary blade assembly. According to the wind power converting apparatus, the operating efficiency of the wind power converting apparatus is increased, power generation is possible even in light wind, and a plurality of generators can be connected together.

28 Claims, 53 Drawing Sheets

BLADE CONFIGURATIONS FOR WIND POWER CONVERTING APPARATUS

TECHNICAL FIELD

The present invention relates to a wind power converting apparatus.

BACKGROUND ART

Wind power converting apparatuses are apparatuses that generate electricity from wind power, or use wind power as a kinetic force, or the like.

Such a wind power converting apparatus generates electricity using the wind that blows from the outside, and includes a rotor unit, which has rotary blades, and a generator unit, which rotates together with the rotation of the rotary blades, to thus generate electricity.

However, wind power converting apparatuses of the related art are limited in the extent to which the generation efficiency thereof can be improved, in consideration of their structures. Therefore, it is demanded that the structure of wind power converting apparatuses be improved in order to increase the generation efficiency thereof.

DISCLOSURE

Technical Problem

An object of the present invention is to provide a wind power converting apparatus, which is configured such that its operating efficiency can be improved.

Technical Solution

An aspect of the present invention provides a wind power converting apparatus that includes a rotor unit. The rotor unit includes a rotary blade assembly having a rotary blade disposed in the longitudinal direction of the rotary shaft, the rotary blade assembly being rotated by the wind from the outside; and a cover, the cover blocking a headwind, which blows opposite to the direction in which the rotary blade assembly is rotated, from being introduced to the rotary blade assembly.

Another aspect of the present invention provides a wind power converting apparatus that includes a rotor unit. The rotor unit includes a rotary blade assembly having a rotary blade disposed in the longitudinal direction of a rotary shaft, the rotary blade assembly being rotated by the wind from the outside; and an auxiliary blade protruding from a surface of the rotary blade assembly, the auxiliary blade increasing the rotational force of the rotary blade assembly by the wind introduced from the outside.

A further aspect of the present invention provides a wind power converting apparatus that includes a rotary blade assembly having a rotary blade disposed in the longitudinal direction of a rotary shaft, the rotary blade assembly being rotated by wind from the outside; an auxiliary blade protruding from a surface of the rotary blade assembly, the auxiliary blade increasing the rotational force of the rotary blade assembly by the wind introduced from the outside; and a piece blade formed on the auxiliary blade, the piece blade increasing the rotational force of the rotary blade assembly by the wind introduced from the outside.

A further another aspect of the present invention provides a wind power converting apparatus that includes a rotary blade assembly comprising a rotary blade disposed in the longitudinal direction of a rotary shaft, the rotary blade assembly being rotated by the wind from the outside; a cover, the cover blocking a headwind, which blows opposite to the direction in which the rotary blade assembly is rotated, from being introduced to the rotary blade assembly; and an elastically deformable portion formed in the cover.

When the wind is introduced to the cover from the outside, the elastically deformable portion is deformed outward by the pressure of the wind, thereby increasing the inner space of the cover in which the air is contained.

When the introduction of the wind into the cover is reduced, the elastically deformable portion is restored to the original state, so that the air, which has been contained inside the cover by the deformation and stretching of the elastically deformable portion, is pushed and is supplied to the inside of the cover.

A still another aspect of the present invention provides a wind power converting apparatus that includes a rotary blade assembly having a rotary blade disposed in the longitudinal direction of a rotary shaft, the rotary blade assembly being rotated by the wind from the outside.

The rotary blade assembly includes the rotary shaft, the rotary blade extending from the rotary shaft, and a bent blade formed on the terminal of the rotary blade. The bent blade is bent in a direction in which the rotary blade is curved, at an angle that is relatively greater than a curvature of the rotary blade.

A yet another aspect of the present invention provides a wind power converting apparatus that includes a rotary blade assembly having a rotary blade disposed in the longitudinal direction of a rotary shaft, the rotary blade assembly being rotated by the wind from the outside. The rotary blade assembly includes the rotary shaft and the rotary blade extending from the rotary shaft. The wind power converting apparatus also includes a drive motor disposed on the rotary shaft on which the rotary blade is provided, the drive motor being capable of rotating the rotary shaft.

Another aspect of the present invention provides a wind power converting apparatus that includes a rotary blade assembly having a rotary blade disposed in the longitudinal direction of a rotary shaft, the rotary blade assembly being rotated by the wind from the outside. The rotary blade assembly includes the rotary shaft and the rotary blade extending from the rotary shaft.

Here, an inner space, which is sealed from the outside, is formed inside the rotary blade, and a working fluid contained in the sealed inner space of the rotary blade. The working fluid flows inside the rotary blade when the rotary blade is rotated by the wind from the outside, thereby increasing a rotational inertia of the rotary blade.

A further aspect of the present invention provides a wind power converting apparatus that includes a rotary blade assembly having a rotary blade disposed in the longitudinal direction of a rotary shaft, the rotary blade assembly being rotated by the wind from the outside. The rotary blade assembly includes the rotary shaft and the rotary blade extending from the rotary shaft. The wind power converting apparatus also includes a weight provided on the terminal of the rotary blade to increase the rotational force of the rotary blade.

A further another aspect of the present invention provides a wind power converting apparatus that includes a rotary blade assembly having a rotary blade disposed in the longitudinal direction of a rotary shaft, the rotary blade assembly being rotated by the wind from the outside. The rotary blade assembly includes the rotary shaft and a plurality of the rotary blades extending from the rotary shaft. The wind power converting apparatus also includes rotary shaft bearings disposed to surround the rotary shaft. The rotary shaft bearings are configured such that they are separated from each other so as to rotate independently from each other on the rotary shaft.

Here, some of the rotary blades are coupled to the rotary shaft bearings, such that the some rotary blades rotate together with the rotary shaft bearings.

The others of the rotary blades are coupled to the rotary shaft, such that the other rotary blades rotate together with the rotary shaft.

A still another aspect of the present invention provides a wind power converting apparatus that includes a rotary blade assembly having a rotary blade disposed in the longitudinal direction of a rotary shaft, the rotary blade assembly being rotated by the wind from the outside. The rotary blade assembly includes the rotary shaft, the rotary blade extending from the rotary shaft, and a partition plate. The partition plate divides the rotary blade into a plurality of sections, such that the rotary blade forms a multi-stage structure. The wind power converting apparatus also includes a partition plate blade protruding from the partition plate. The partition plate blade is exposed to the wind independently from the rotary blade, thereby increasing the rotational force of the rotor unit.

Another aspect of the present invention provides a wind power converting apparatus that includes a rotary blade assembly having a rotary blade disposed in the longitudinal direction of a rotary shaft, the rotary blade assembly being rotated by the wind from the outside. The rotary blade assembly comprises the rotary shaft and the rotary blade extending from the rotary shaft. The wind power converting apparatus also includes a rotary shaft blade extending from the rotary shaft.

Here, the rotary blade includes a rotary blade body, an inner rotary blade extending from the rotary blade body to the rotary shaft blade, and an outer rotary blade extending outward from the rotary blade body.

A further aspect of the present invention provides a wind power converting apparatus that includes a rotary blade assembly having a rotary blade disposed in the longitudinal direction of a rotary shaft, the rotary blade assembly being rotated by the wind from the outside. The rotary blade assembly includes the rotary shaft from which a rotary shaft blade extends, the rotary blade extending from the rotary shaft and including an inner rotary blade extending from a rotary blade body to the rotary shaft blade, and a partition plate. The partition plate divides the rotary blade into a plurality of sections, such that the rotary blade forms a multi-stage structure. The wind power converting apparatus also includes a wind guide inclined toward the inner rotary blade such that wind that flows over the partition plate is guided toward the inner rotary blade.

Advantageous Effects

According to an aspect of the present invention, the wind power converting apparatus is provided with the cover, which prevents a headwind, which blows opposite to the direction in which the rotary blade assembly rotates, from being introduced to the rotary blade assembly, or with the auxiliary blades, which protrude from the surface of the rotary blade assembly in order to increase the rotational force of the rotary blade assembly using the wind that is introduced from the outside. This configuration provides effects such that the operating efficiency of the wind power converting apparatus is increased, power generation is possible even in light wind, and a plurality of generators can be connected together.

BEST MODE

A wind power converting apparatus of the present invention will now be described more fully with reference to the accompanying drawings, in which exemplary embodiments thereof are shown. In the following description, the wind power converting apparatus is presented as generating power by driving a generator unit using the rotational force of a rotor unit, but this is for illustrative purposes only. It will be apparent, on the contrary, that the wind power converting apparatus of the present invention is applicable to a variety of fields in which the rotational force of the rotor unit can be directly used as driving force, e.g., can be used as the propelling force for a ship or the like.

Figure 1:
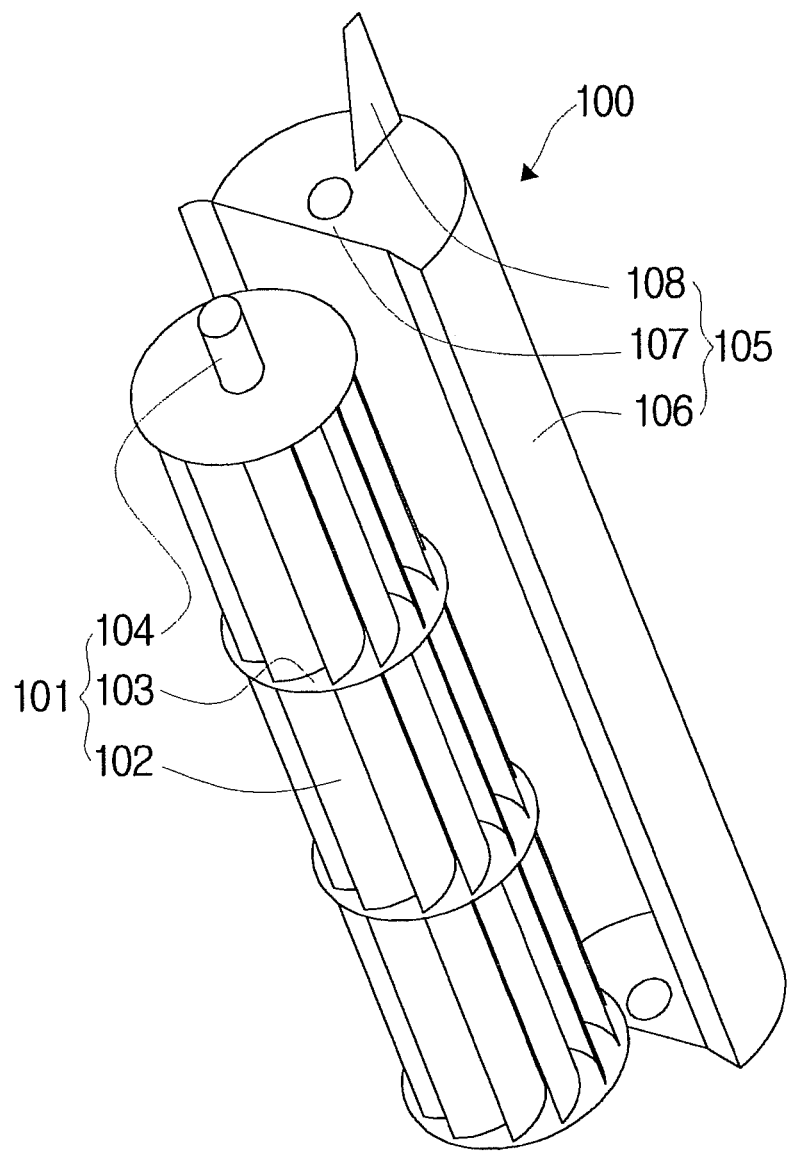
FIG. 1 is a perspective view showing a wind power converting apparatus according to a first embodiment of the present invention, from which a rotor unit is disassembled.
Figure 2:
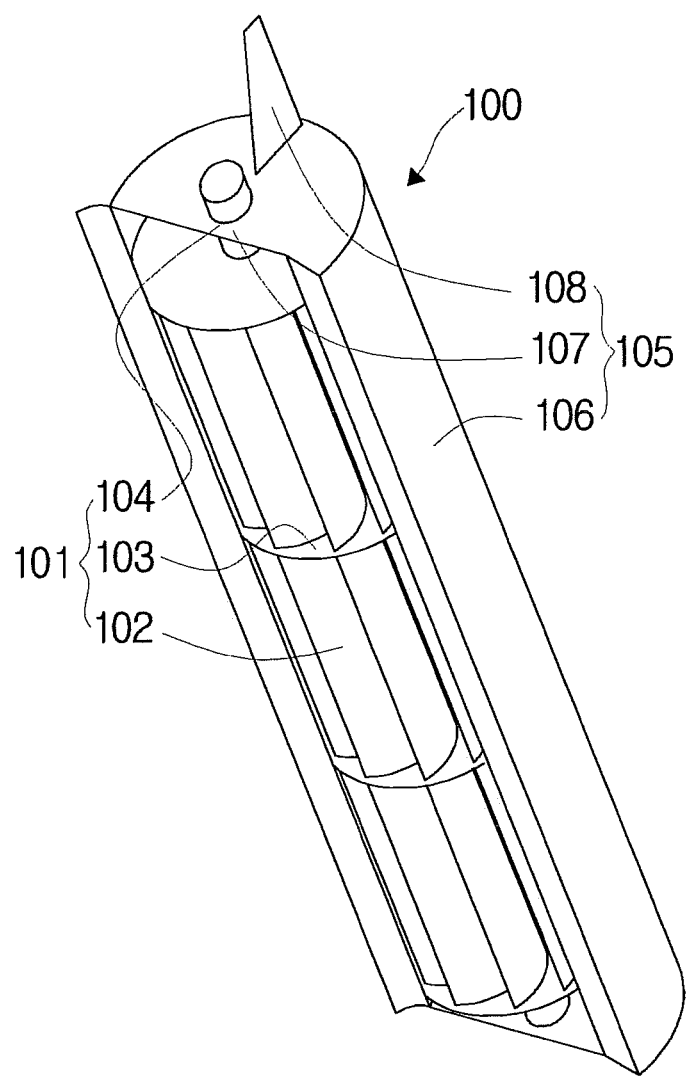
FIG. 2 is a perspective view showing the wind power converting apparatus according to the first embodiment of the present invention, to which the rotor unit is assembled.
Figure 3:
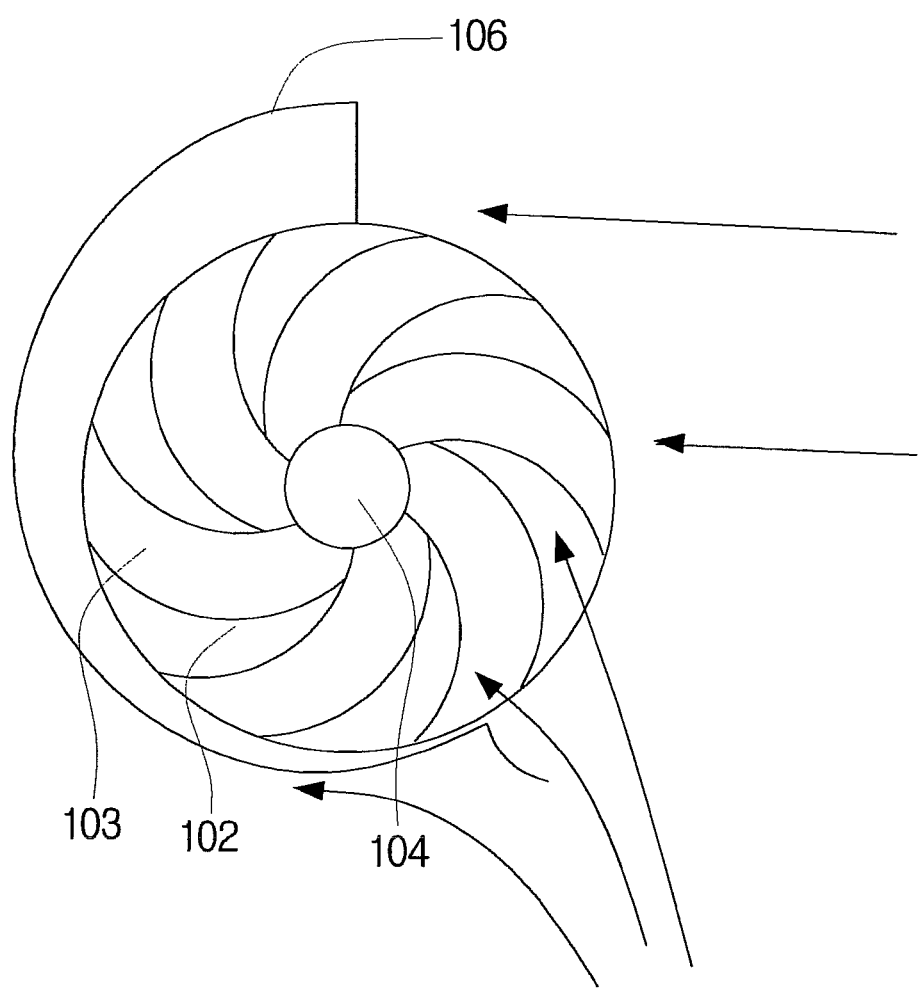
FIG. 3 is a view showing the flow of air in the rotor unit of the wind power converting apparatus according to the first embodiment of the present invention.
Figure 4:
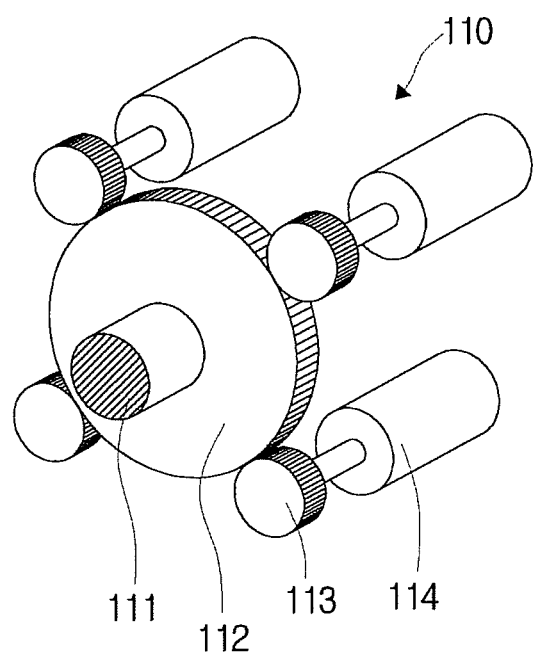
FIG. 4 is a perspective view showing a generator unit of the wind power converting apparatus according to the first embodiment of the present invention.

FIG. 1 is a perspective view showing a wind power converting apparatus according to a first embodiment of the present invention, from which a rotor unit is disassembled, FIG. 2 is a perspective view showing the wind power converting apparatus according to the first embodiment of the present invention, to which the rotor unit is assembled, FIG. 3 is a view showing the flow of air in the rotor unit of the wind power converting apparatus according to the first embodiment of the present invention, and FIG. 4 is a perspective view showing a generator unit of the wind power converting apparatus according to the first embodiment of the present invention.

Referring to FIG. 1 to FIG. 4 together, the rotor unit 100 of the wind power converting apparatus of this embodiment includes a rotary blade assembly 101 and a cover 105.

The rotary blade assembly 101 includes a plurality of rotary blades 102, partition plates 103 and a rotary shaft 104, and is rotated by the wind from the outside that blows perpendicular to the rotary shaft 104. The rotary blades 102 extend in the longitudinal direction of the rotary shaft 104.

In the following embodiments, even though it is not explicitly noted, the definition of a rotary blade assembly includes any assembly, as long as it includes a plurality of rotary blades, a rotary shaft and the like.

The cover 105 includes a cover body 106, rotary shaft receptacles 107 and a rudder 108, and serves to prevent the headwind, relative to the direction in which the rotary blade assembly 101 rotates, from blowing into the rotary blade assembly 101. The cover 105 rotates about the rotary shaft 104 in the direction in which the wind blows, so that the wind can be more efficiently introduced to the rotary blade assembly 101.

A plurality of the rotary blades 102 extends from the rotary shaft 104, and may be configured such that they are curved at a predetermined curvature or has a predetermined number of bends. The rotary blades 102 are curved with a large curvature, such that the rotary blades 102 can be efficiently rotated by the wind. This can also prevent the headwind from blowing into the rotary blades 102.

One or more of the partition plates 103 are disposed along the rotary shaft 104 to divide the respective rotary blade 102 into multiple sections, such that the rotary blade 102 is configured as a multi-stage structure.

The rotary blades 102 may be configured as a multi-stage structure such that the positions of the blades correspond to each other, or such that the positions of the blades are staggered from each other at predetermined angles.

The rotary blade assembly 101 may be constructed by connecting multiple sets including the partition plates 103 and the rotary blades 102 to each other.

The wind from the outside is introduced perpendicularly to the rotary shaft 104, so that the rotary blades 102, which extend from the rotary shaft 104, rotate.

The cover 105 is configured such that the cover body 106 is curved at a predetermined curvature, so as to cover part of the rotary blade assembly 101. The wind that is blowing in one direction acts as a favorable wind for one half of the rotary blade assembly 101, and simultaneously acts as a headwind for the other half of the rotary blade assembly 101, with respect to the rotary shaft 104. Thus, it is preferred that the cover 105 surround half of the rotary blade assembly 101 with respect to the rotary shaft 104. The cover 105 can then minimize the headwind from blowing to the rotary blade assembly 101, so that operating efficiency is increased.

The rotary shaft 104 is rotatably fitted into the rotary shaft receptacles 107. The rudder 108 allows the rotor unit 100 to rotate in the direction in which the wind blows.

In this embodiment, the rotary shaft 104 of the rotary blade assembly 101 is oriented vertically with respect to the ground on which it is disposed.

In the meantime, the generator unit 110 of the wind power converting apparatus includes a rotary shaft 111, which is connected to the rotary shaft 104 of the rotor unit 100, a driving gear 112, which is connected to the rotary shaft 111, a plurality of driven gears 113, which are engaged with the driving gears 112, and a plurality of generators 114, which are connected to respective driven gears 113. Then, the multiple generators 114 can be connected to the rotary shaft 104 of the rotary blade assembly 101 to generate electricity, thereby increasing the amount of power that is generated.

Here, the driven gears 113, the driving gear 112 and the like are for illustrative purposes only, and other various types of power transmission devices can also be applied.

Although it has been presented in the above description that power generation is carried out using the generator unit 110, this is for illustrative purposes only. A single generator (not shown) structure, in which a shaft is directly connected to the rotary shaft 104 of the rotor unit 100, can also be presented.

Mode for Invention

Descriptions will be given below of the other embodiments of the present invention with reference to the accompanying drawings. In the following, descriptions of some features will be omitted, since they are identical to those of the above-described first embodiment of the present invention.

Figure 5:
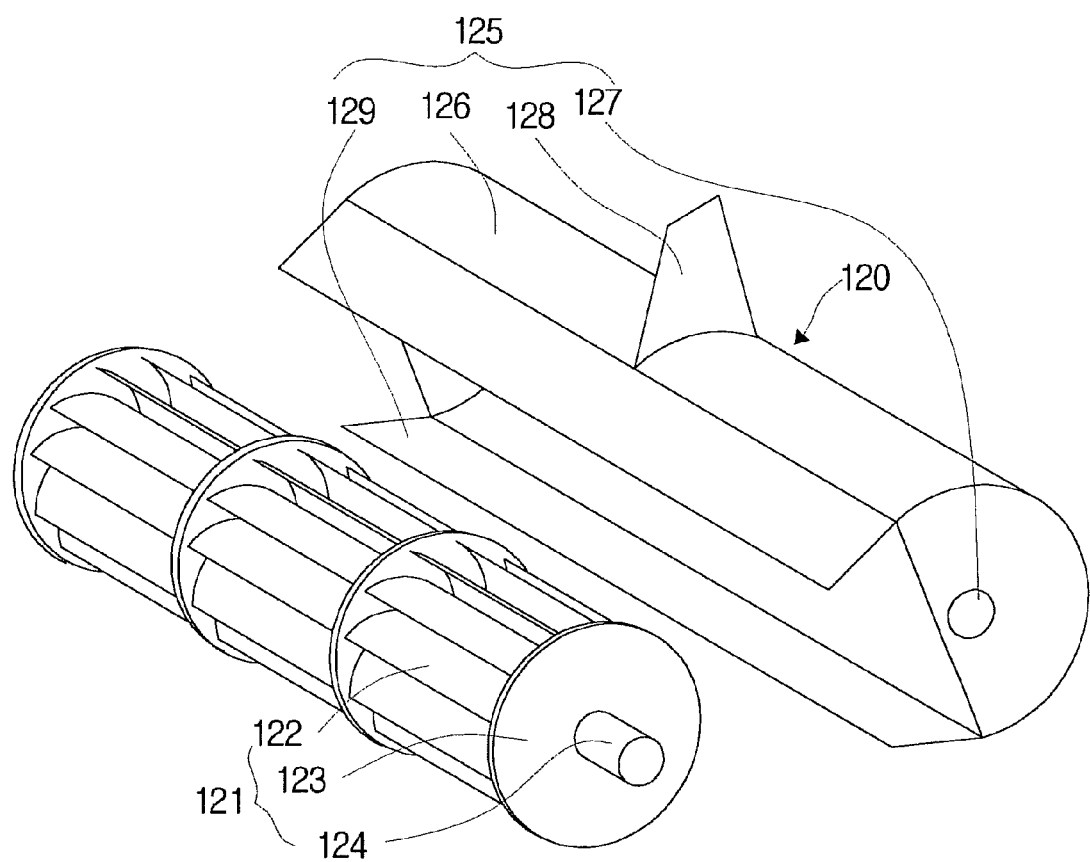
FIG. 5 is a perspective view showing a wind power converting apparatus according to a second embodiment of the present invention, from which a rotor unit is disassembled.
Figure 6:
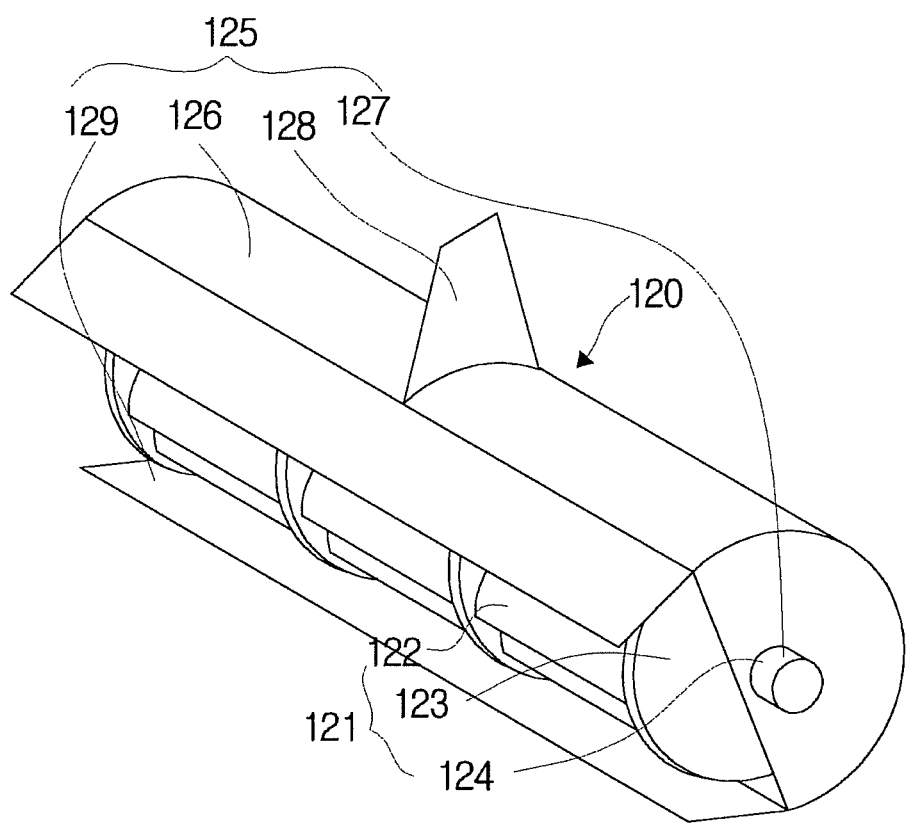
FIG. 6 is a perspective view showing the wind power converting apparatus according to the second embodiment of the present invention, to which the rotor unit is assembled.

FIG. 5 is a perspective view showing a wind power converting apparatus according to a second embodiment of the present invention, from which a rotor unit is disassembled, and FIG. 6 is a perspective view showing the wind power converting apparatus according to the second embodiment of the present invention, to which the rotor unit is assembled.

Referring to FIG. 5 and FIG. 6 together, in this embodiment, a rotary shaft 124 of a rotary blade assembly 121 of a rotor unit 120 is oriented horizontally with respect to the ground on which it is disposed, and a cover 125, which surrounds part of the rotary blade assembly 121, is also oriented horizontally.

In this embodiment, wind guides 129 extend toward the front side of the cover 125, i.e. in the direction from which the wind blows. The wind guides 129 serve to guide the favorable wind, which is in the direction in which the rotary blade assembly 121 rotates, to the rotary blade assembly 121. The favorable wind is then efficiently introduced to the rotary blade assembly 121, such that the rotational force of the rotary blade assembly 121 is increased, thereby increasing the operating efficiency.

Figure 7:
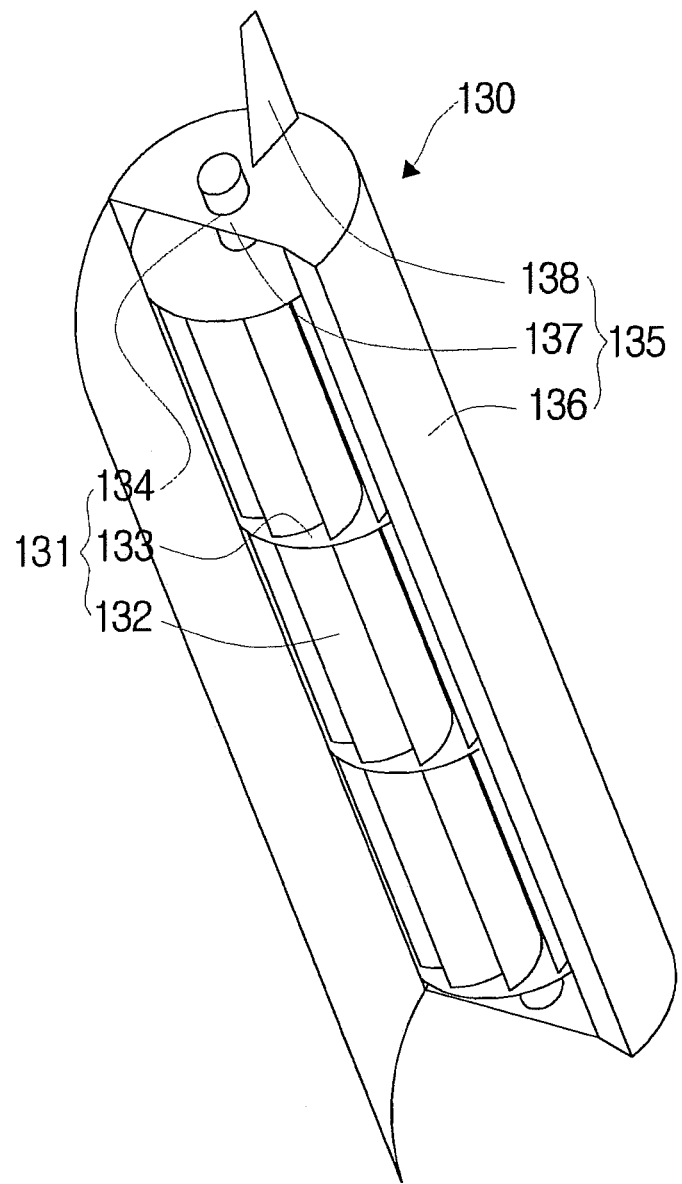
FIG. 7 is a perspective view showing a wind power converting apparatus according to a third embodiment of the present invention, from which a rotor unit is disassembled.
Figure 8:
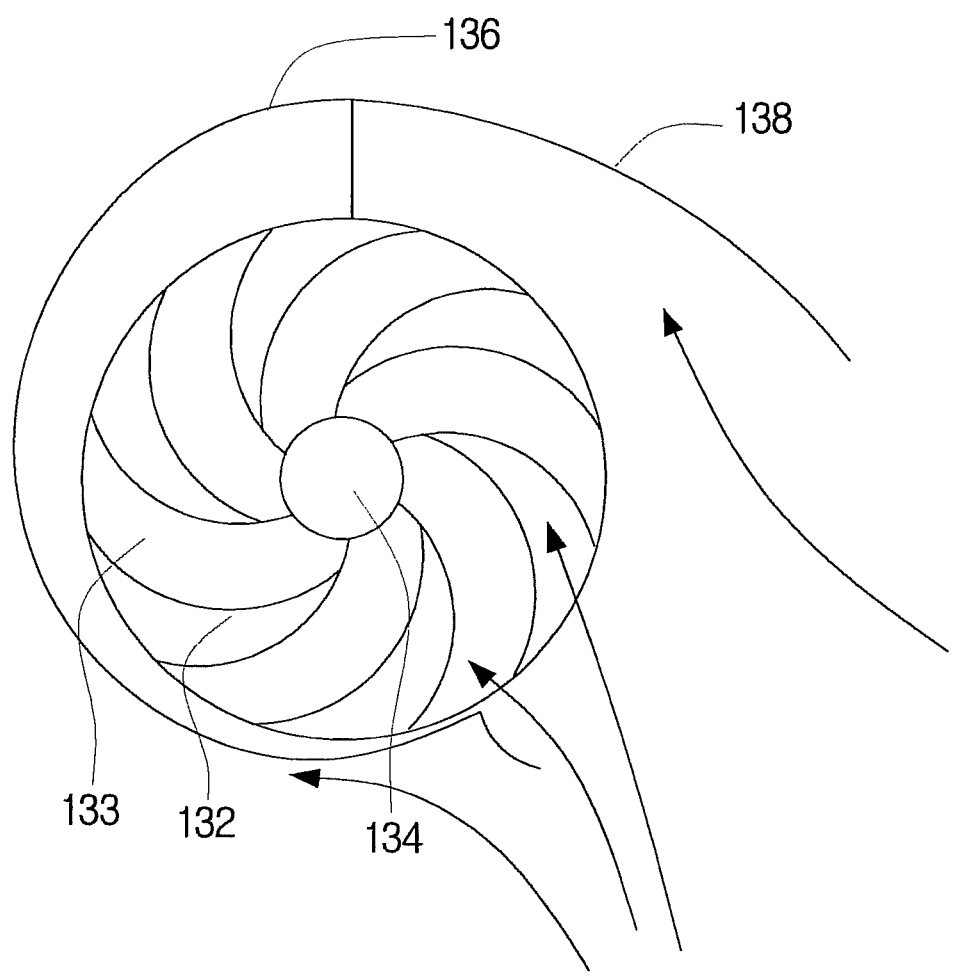
FIG. 8 is a view showing the flow of air in the rotor unit of the wind power converting apparatus according to the third embodiment of the present invention.

FIG. 7 is a perspective view showing a wind power converting apparatus according to a third embodiment of the present invention, from which a rotor unit is disassembled, and FIG. 8 is a view showing the flow of air in the rotor unit of the wind power converting apparatus according to the third embodiment of the present invention.

Referring to FIG. 7 and FIG. 8 together, in this embodiment, a rotary shaft 134 of a rotary blade assembly 131 is oriented vertically with respect to the ground on which it is disposed, a cover 135 is also oriented vertically, and a wind guide 138 extends from the cover 135. The functions of the wind guide 138 are the same as those of the wind guide 129 shown in FIG. 5 and FIG. 6.

Figure 9:
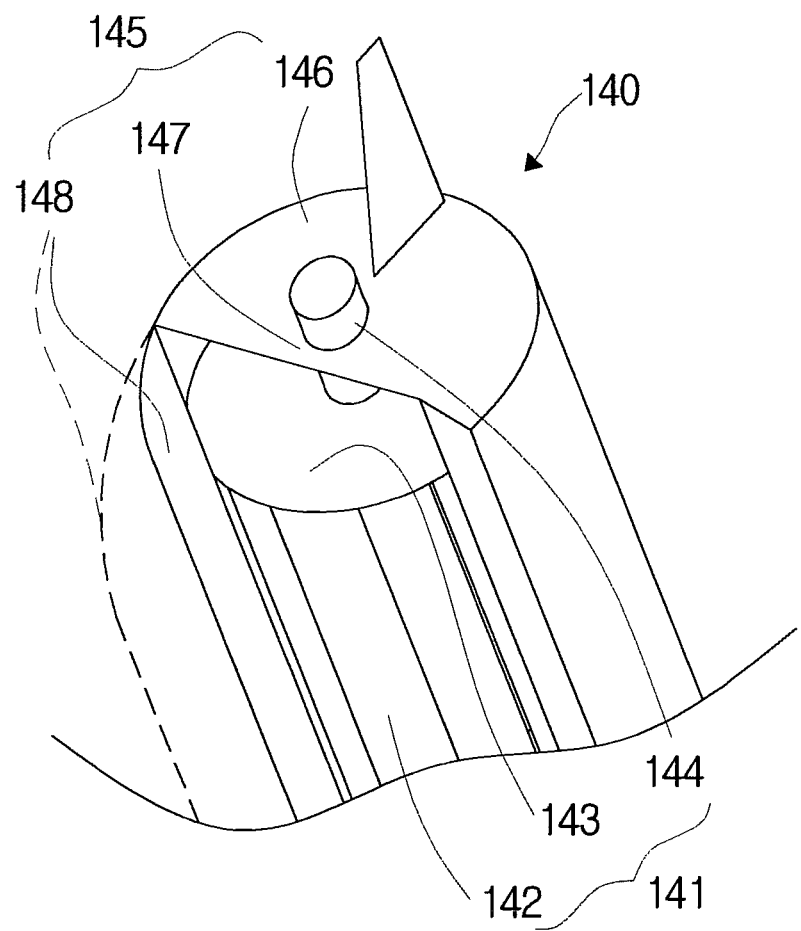
FIG. 9 is a perspective view showing part of a rotor unit of a wind power converting apparatus according to a fourth embodiment of the present invention.

FIG. 9 is a perspective view showing part of a rotor unit of a wind power converting apparatus according to a fourth embodiment of the present invention.

Referring to FIG. 9, in this embodiment, a wind guide 148 is configured such that its length is variable with respect to the body 146 of a cover 145. The length of the wind guide 148 can be manually changed by an operator, or can be automatically changed by a controller (not shown), a drive motor and the like, by sensing the intensity of the wind.

When the length of the wind guide 148 is variable as described above, the length of the wind guide 148 can be changed depending on the intensity of the wind, such that the rotation of the rotary blade assembly 141 can be adjusted, so that the rotary blade assembly 141 becomes suitable for power generation so as to be exposed to more wind, thereby increasing the operating efficiency.

Figure 10:
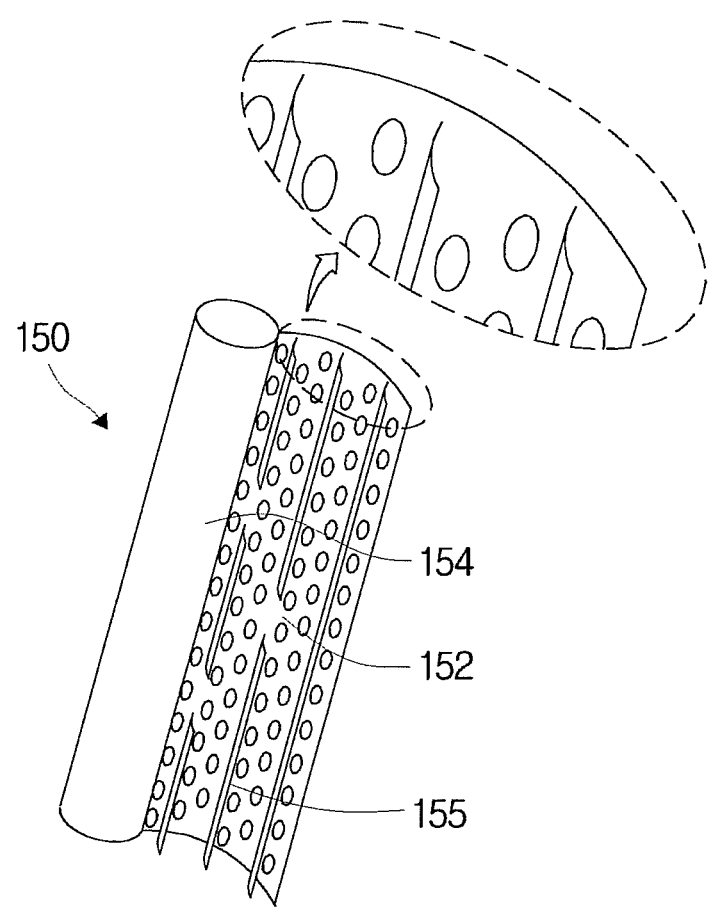
FIG. 10 is a perspective view showing a rotary blade, which is applied to a rotor unit of a wind power converting apparatus according to a fifth embodiment of the present invention.

FIG. 10 is a perspective view showing a rotary blade, which is applied to a rotor unit of a wind power converting apparatus according to a fifth embodiment of the present invention.

Referring to FIG. 10, in this embodiment, a rotor unit 150 includes a rotary shaft 154, rotary blades 152 and auxiliary blades 155, and is intended to rotate while the wind is introduced from the outside in the direction perpendicular to the rotary shaft 154.

Each rotary blade 152 extends in a curve from the rotary shaft 154.

The auxiliary blades 155 protrude from the surface of the rotary blade 152 in order to increase the rotational force of the rotary blade 152 using the wind that is introduced thereto from the outside. The direction in which the auxiliary blades 155 protrude may be set at an acute angle with respect to the surface of the rotary blade 152. The auxiliary blades 155 may have a width that is the same as that of the rotary blade 152, or may be formed in a structure in which they are divided into a plurality of pieces.

Since the auxiliary blades 155 are additionally provided as described above, the resistance to the wind can be further increased, such that the rotational force of the rotor unit 150 is increased, thereby increasing the operating efficiency.

Figure 11:
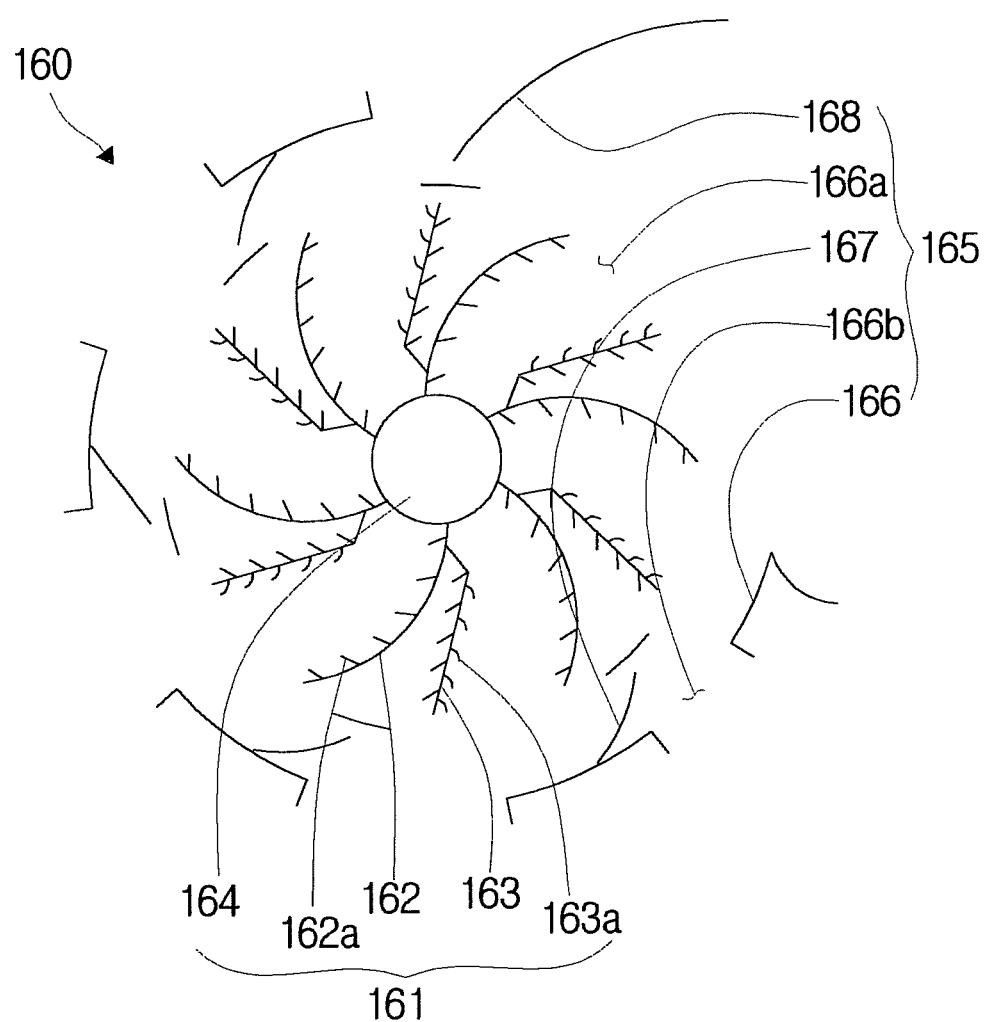
FIG. 11 is a view showing a rotor unit of a wind power converting apparatus according to a sixth embodiment of the present invention.

FIG. 11 is a view showing a rotor unit of a wind power converting apparatus according to a sixth embodiment of the present invention.

Referring to FIG. 11, this embodiment includes a rotary blade assembly 161 and a cover 165.

In the rotary blade assembly 161, rotary blades 162 and 163 are integrated with each other as a pair, and a plurality of such rotary blade pairs is disposed around a rotary shaft 164. Each rotary blade 162 or 163 has a plurality of auxiliary blades 162a or 163a.

The cover 165 includes a cover body 166, wind guide blades 167 and a wind guide 168.

The cover body 166 is disposed such that it surrounds the rotary blade assembly 161, and may be fixed to the place in which it is disposed. The wind guide 168 is configured such that it extends a predetermined length from the cover body 166. The cover body 166 has defined therein a main wind inlet hole 166a, through which the wind that is guided by the wind guide 168 is introduced, and a plurality of auxiliary wind inlet holes 166b, which are formed along the cover body 166. The wind guide blades 167 are provided inside the cover body 166, such that they guide the wind through the auxiliary wind inlet holes 166b.

Since a plurality of the auxiliary wind inlet holes 166b is provided as described above, the wind from a plurality of directions can be introduced to the rotary blade assembly 161, thereby increasing the operating efficiency.

Figure 12:
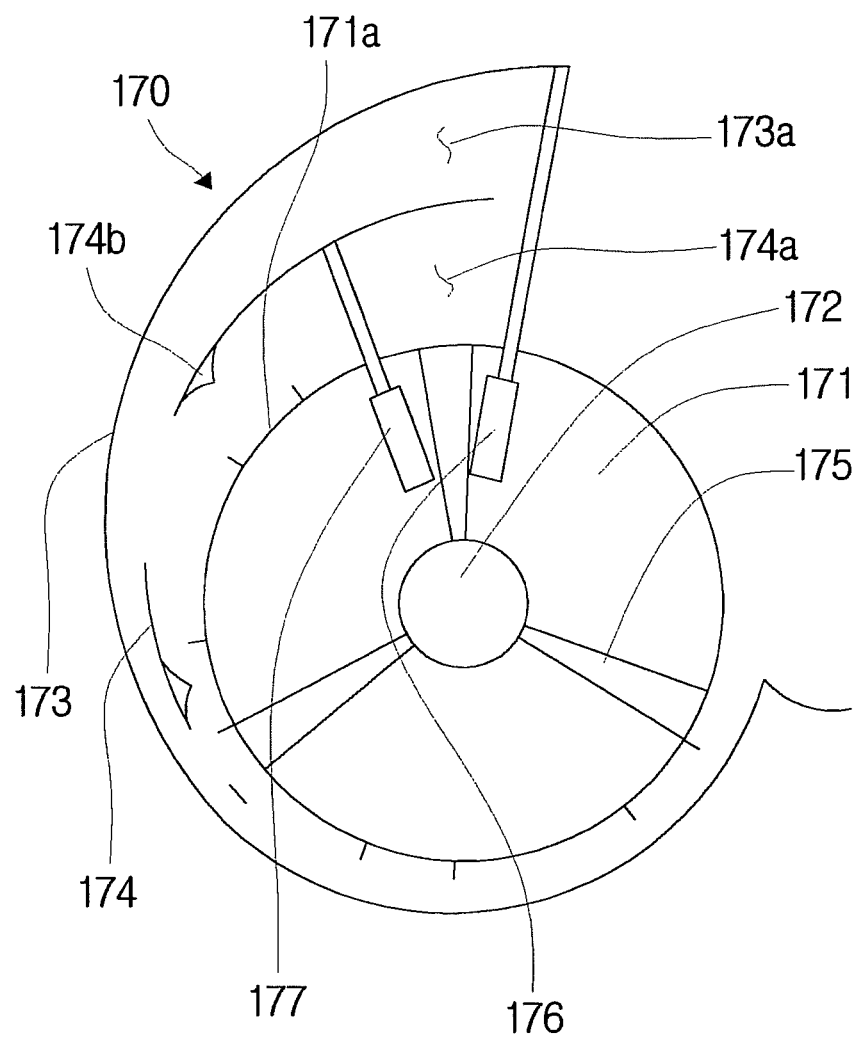
FIG. 12 is a view showing a rotor unit of a wind power converting apparatus according to a seventh embodiment of the present invention.

FIG. 12 is a view showing a rotor unit of a wind power converting apparatus according to a seventh embodiment of the present invention.

Figure 17:
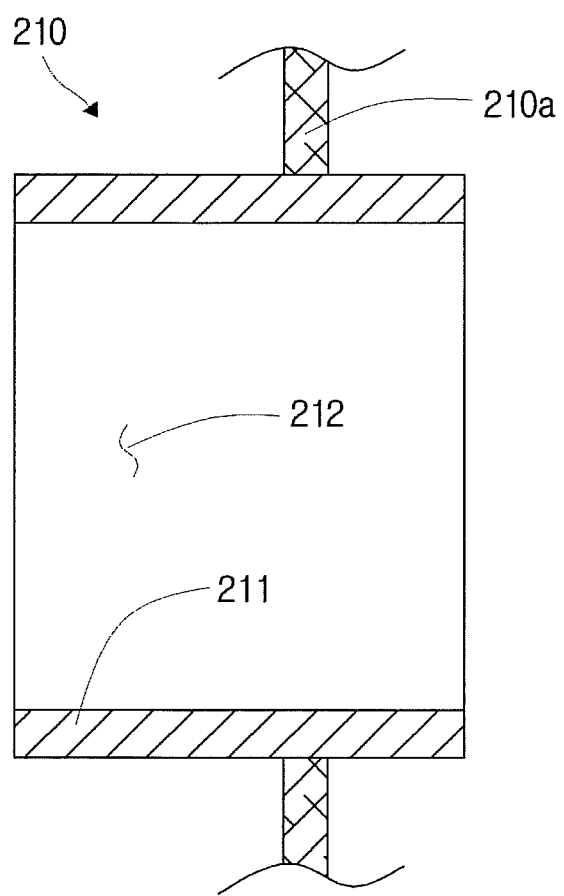
FIG. 17 is a view showing an air-communicating section in a blade, which is applied to a rotor unit of a wind power converting apparatus according to an eleventh embodiment of the present invention.

Referring to FIG. 17, in this embodiment, a rotor unit 170 includes several layers of covers 171, 174 and 173, and surrounds a rotary blade assembly (not shown).

The several layers of covers 171, 174 and 173 include the innermost cover 171, which surrounds the rotary blade assembly, an inner cover 174, which surrounds the innermost cover 171, and an outer cover 173, which surrounds the inner cover 174. The inner cover 174 may be configured as a plurality of covers.

When disposed as above, the outer cover 173 surrounds the rotary blade assembly, and the inner cover 174 and the innermost cover 171 are disposed between the outer cover 173 and the rotary blade assembly.

The space between the outer cover 173 and the rotary blade assembly is partitioned by the inner cover 174 such that a plurality of wind inlet holes 173a and 174a is formed therein. The wind inlet holes 173a and 174a introduce the wind to different portions of the rotary blade assembly.

Described in detail, the inner cover 174 extends to a predetermined portion of the rotary blade assembly, and the wind inlet hole 174a inside the inner cover 174 is formed such that it reaches to the terminal of the inner cover 174. Consequently, the wind can be introduced to the inside of the rotary blade assembly through the wind inlet hole 174a, thereby increasing operating efficiency.

The rotor unit 170 includes variable members 176 and 177. The variable member 176 is connected to the outer cover 173, and the variable member 177 is connected to the inner cover 174, such that the positions of the outer cover 173 and the inner cover 174 with respect to the rotary shaft 172 can be changed. The variable members 176 and 177 may employ a hydraulic cylinder or the like.

Since the variable members 176 and 177 change the positions of the outer cover 173 and the inner cover 174 as described above, the opening intervals of the wind inlet holes 173a and 174 can be changed, and can thus be adjusted depending on the intensity of the wind or the like. Accordingly, operating efficiency can be increased.

Figure 13:
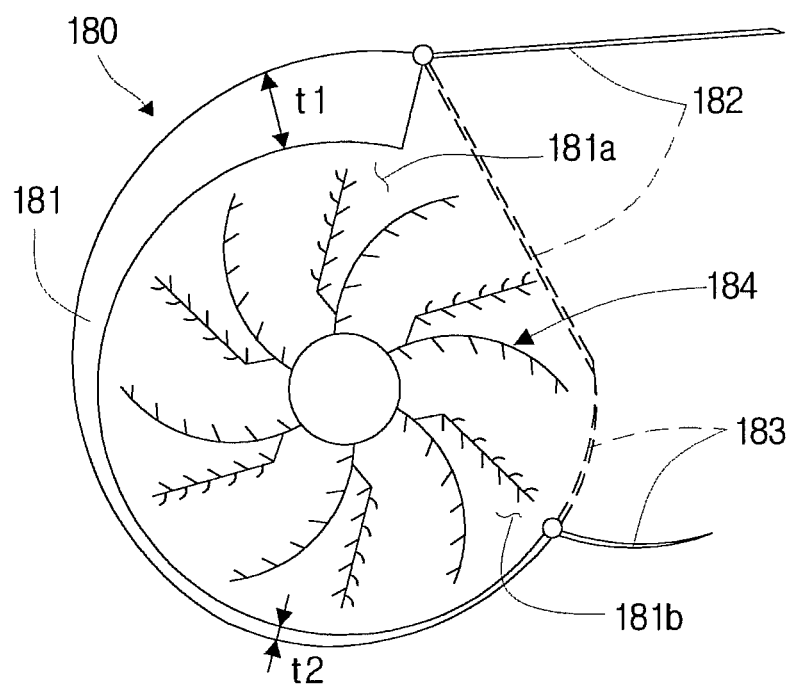
FIG. 13 is a view showing a rotor unit of a wind power converting apparatus according to an eighth embodiment of the present invention.

FIG. 13 is a view showing a rotor unit of a wind power converting apparatus according to an eighth embodiment of the present invention.

Referring to FIG. 13, in this embodiment, a rotor unit 180 includes a rotary blade assembly 184, a cover 181, and opening/closing members 182 and 183.

The cover 181 is configured such that its thicknesses t1 and t2 change in the direction from an inlet hole 181a, through which the wind is introduced to the rotary blade assembly 184 from the outside, to an outlet hole 181b, through which the wind that has passed through the rotary blade assembly 184 is exhausted.

The opening/closing members 182 and 183 are connected to respective portions of the cover 181 that are adjacent to respective inlet hole 181a and outlet hole 181b, such that they open or close the inlet hole 181a and the outlet hole 181b. When the wind is weak, the opening/closing member 182 adjacent to the inlet hole 181a may act as a wind guide.

Figure 14:
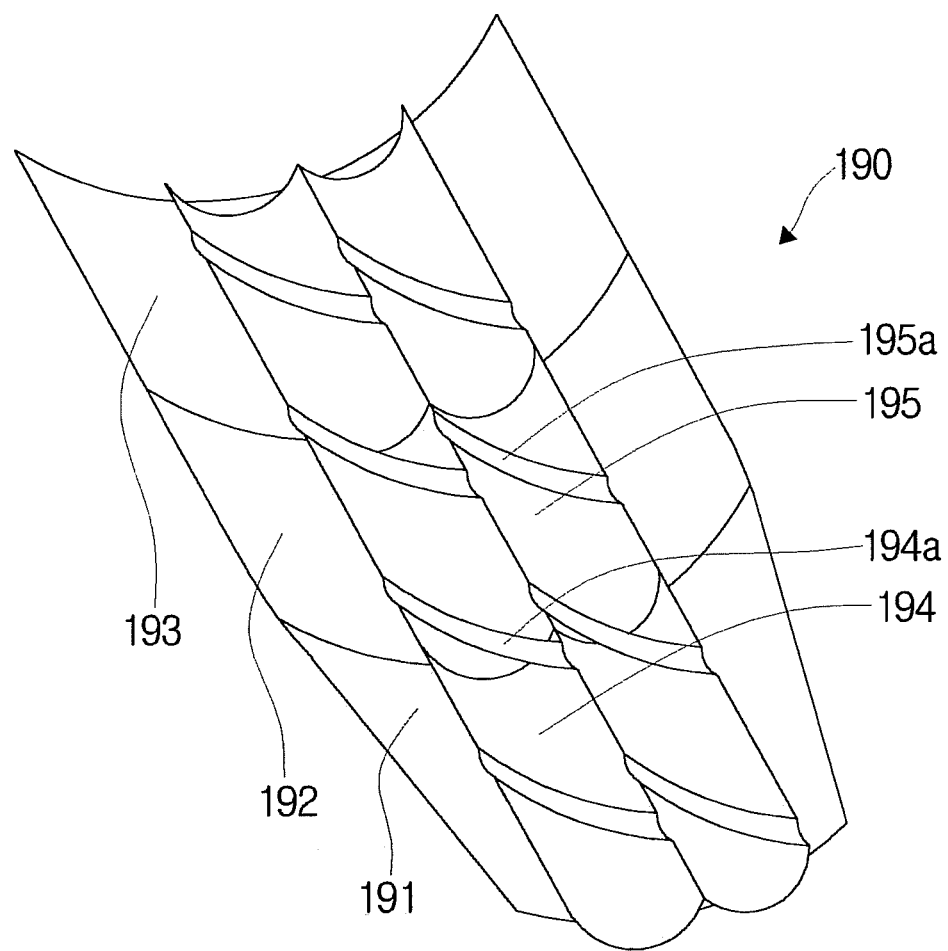
FIG. 14 is a view showing an opening/closing member, which is applied to a rotor unit of a wind power converting apparatus according to a ninth embodiment of the present invention.

FIG. 14 is a view showing an opening/closing member, which is applied to a rotor unit of a wind power converting apparatus according to a ninth embodiment of the present invention.

Referring to FIG. 14, in this embodiment, an opening/closing member 190 is applied to a rotor unit. The opening/ closing member 190 may be disposed at the position of the opening/closing member 182 shown in FIG. 13, thereby replacing the opening/closing member 182.

The opening/closing member 190 includes outer opening/closing sections 191, 192 and 193, which are curved at a predetermined curvature, inner opening/closing portions 194 and 195, which are disposed inside the outer opening/closing portions 191, 192 and 193 and are curved at a predetermined curvature that is different from that of the outer opening/closing portions 191, 192 and 193, and vortex-forming portions 194*a* and 195*a*, which are formed in the inner opening/closing portions 194 and 195, such that they guide the wind that passes through the inner opening/closing portions 194 and 195 so as to form vortexes.

The outer opening/closing portions 191, 192 and 193 are formed at an incline, such that the outer opening/closing portion 193, which is in the entrance side along the passage through which the wind flows, has a width greater than that of the outer opening/closing portion 191, which is in the exit side, and such that the width of the outer opening/closing portion 191 in the exit side is gradually decreased. Consequently, the velocity of the wind can increase in the outer opening/closing portion 191 in the exit side.

The vortex-forming portions 194*a* and 195*a* may be presented as spiral grooves, which are formed in respective inner opening/closing portions 194 and 195. When the wind passes by the vortex-forming portions 194*a* and 195*a*, vortexes are formed, so that the wind presses the vortex-forming portions 194*a* and 195*a*, thereby increasing the rotational force of the rotor unit.

In the outer opening/closing portions 191, 192 and 193 and the inner opening/closing portions 194 and 195, the portions in the terminals may overlap the portions in the middle, such that their lengths are changed. As an example, the portion 193 in the terminal of the outer opening/closing portions 191, 192 and 193 may overlap the middle portion 192. In this case, the length of the outer opening/closing portions 191, 192 and 193 may be decreased. In contrast, the portion 193 in the terminal of the outer opening/closing portions 191, 192 and 193 may extend from the middle portion 192, such that the length of the outer opening/closing portions 191, 192 and 193 is increased.

Since the length of the outer opening/closing portions 191, 192 and 193 and the length of the inner opening/closing portions 194 and 195 can be changed as described above, the lengths can be increased when the wind is strong, but be decreased when the wind is weak, so that efficient operation can be realized.

Figure 15:
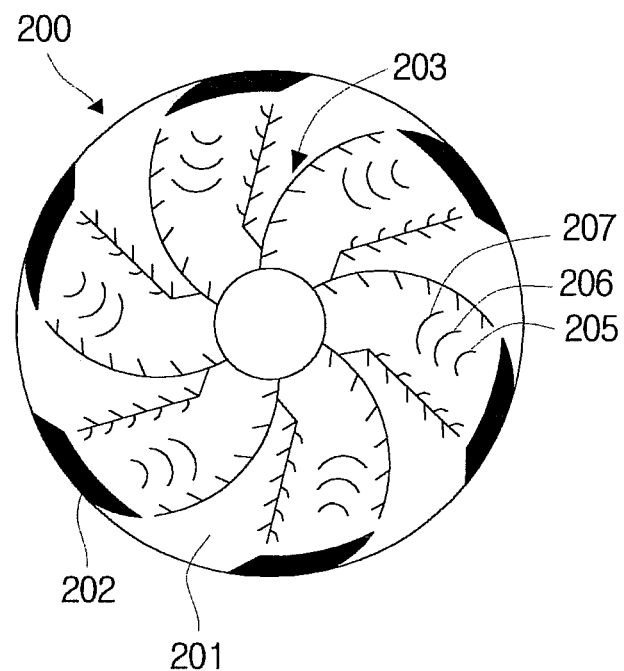
FIG. 15 is a view showing a rotor unit of a wind power converting apparatus according to a tenth embodiment of the present invention.
Figure 16:
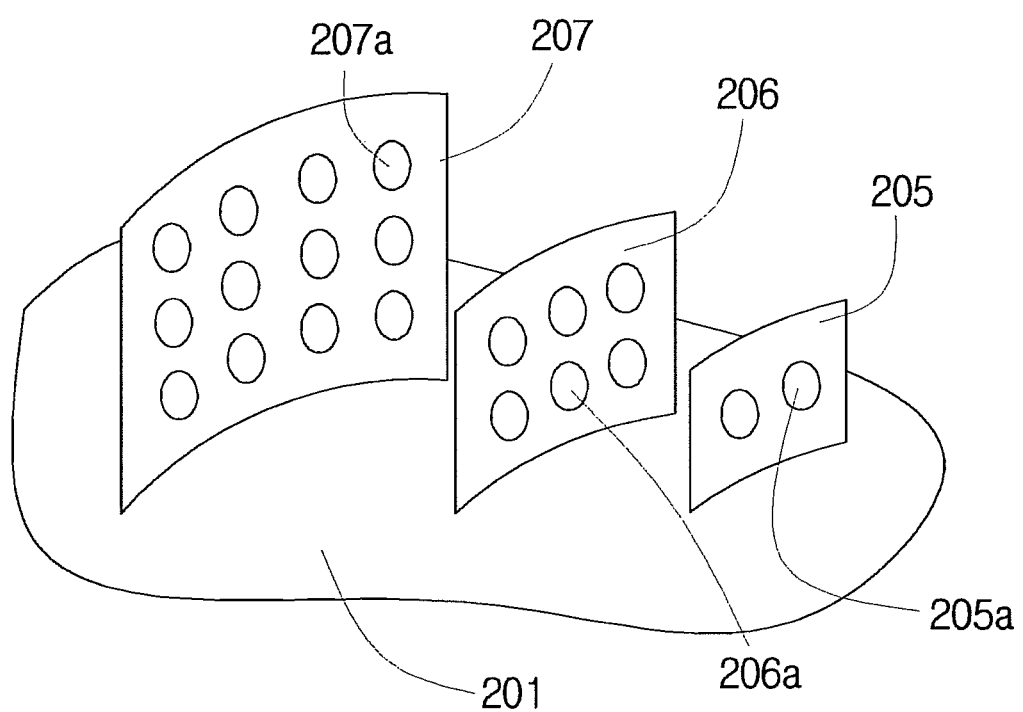
FIG. 16 is a view showing part of a rotary blade, which is applied to the rotor unit of the wind power converting apparatus according to the tenth embodiment of the present invention.

FIG. 15 is a view showing a rotor unit of a wind power converting apparatus according to a tenth embodiment of the present invention, and FIG. 16 is a view showing part of a rotary blade, which is applied to the rotor unit of the wind power converting apparatus according to the tenth embodiment of the present invention.

Referring to FIG. 15 and FIG. 16 together, in this embodiment, a partition plate 201 of a rotor unit 200 has weights 202.

Since the weights 202 are provided, the rotational force of the rotor unit 200 can be increased due to inertia when the rotor unit 200 rotates.

In addition, a plurality of piece blades 205, 206 and 207 having different heights is provided on the surface of the partition plate 201 of the rotor unit 200.

As shown in FIG. 16, the piece blades 205, 206 and 207 have through-holes 205*a*, 206*a* and 207*a*, through which the wind passes. The through-holes 205*a*, 206*a* and 207*a* may be formed in different numbers depending on the size of the respective piece blades 205, 206 and 207.

FIG. 17 is a view showing an air-communicating section in a blade, which is applied to a rotor unit of a wind power converting apparatus according to an eleventh embodiment of the present invention.

Referring to FIG. 17, in this embodiment, a through pipe 210 is disposed in each of the through-holes 205*a*, 206*a* and 207*a* shown in FIG. 16.

The through pipe 210 is configured such that both ends of the body 211 thereof protrude predetermined heights from both surfaces of a partition plate, and is hollow. Due to the protruding shape of the body 211, a flow of wind through the through pipe 210 can efficiently move without blowing back.

In the meantime, vortex-forming grooves (not shown) having a spiral shape, which is similar to that of the vortex-forming portions 194*a* and 195*a* shown in FIG. 14, may also be formed inside the through pipe 210 in order to form vortexes in the wind that passes through the through pipe 210.

Figure 18:
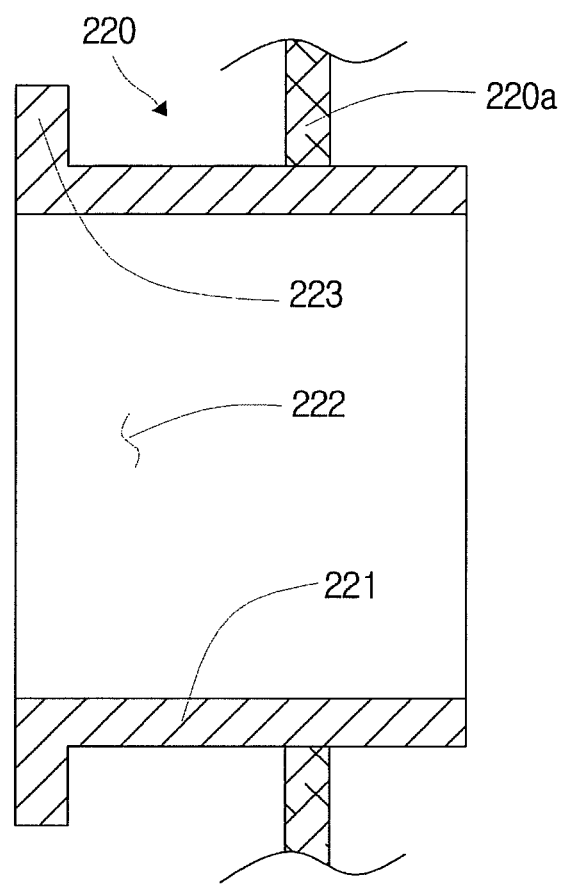
FIG. 18 is a view showing an air-communicating section in a blade, which is applied to a rotor unit of a wind power converting apparatus according to a twelfth embodiment of the present invention.

FIG. 18 is a view showing an air-communicating section in a blade, which is applied to a rotor unit of a wind power converting apparatus according to a twelfth embodiment of the present invention.

Referring to FIG. 18, in this embodiment, a through pipe 220 is disposed in each of the through-holes 205*a*, 206*a* and 207*a* shown in FIG. 16.

The through pipe 220 is configured such that both ends of the body 221 thereof protrude predetermined heights from both surfaces of a partition plate 220*a*, and is hollow. The through pipe 220 has an outward flange 223 on the terminal of one end thereof, through which the wind is exhausted, in order to prevent the wind from blowing back.

Since the flange 223 is formed, the effect of preventing the wind from blowing back in the through pipe 220 can be enhanced.

Figure 19:
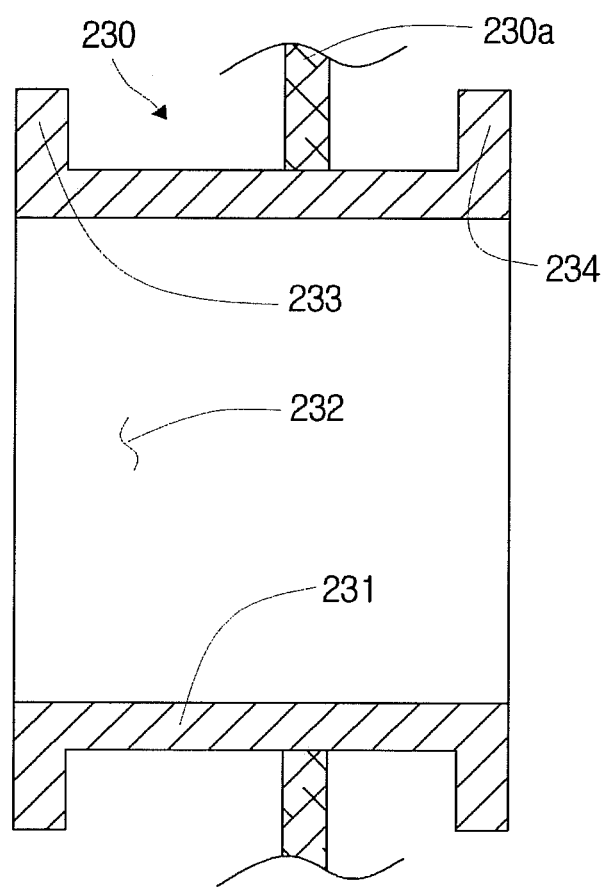
FIG. 19 is a view showing an air-communicating section in a blade, which is applied to a rotor unit of a wind power converting apparatus according to a thirteenth embodiment of the present invention.

FIG. 19 is a view showing an air-communicating section in a blade, which is applied to a rotor unit of a wind power converting apparatus according to a thirteenth embodiment of the present invention.

Referring to FIG. 19, in this embodiment, a through pipe 230 is disposed in each of the through-holes 205*a*, 206*a* and 207*a* shown in FIG. 16.

The through pipe 230 is configured such that both ends of the body 231 thereof protrude predetermined heights from both surfaces of a partition plate 230*a*, and is hollow. The through pipe 230 has an outward flange 233 on the terminal of one end thereof, through which the wind is exhausted, in order to prevent the wind from blowing back, and also has an outward flange on the terminal of the other end thereof, through which the wind is introduced, in order to prevent the wind blowing back.

Since the flange 233 is formed, it is possible to enhance the effect of preventing the wind from blowing back in the through pipe 230.

Figure 20:
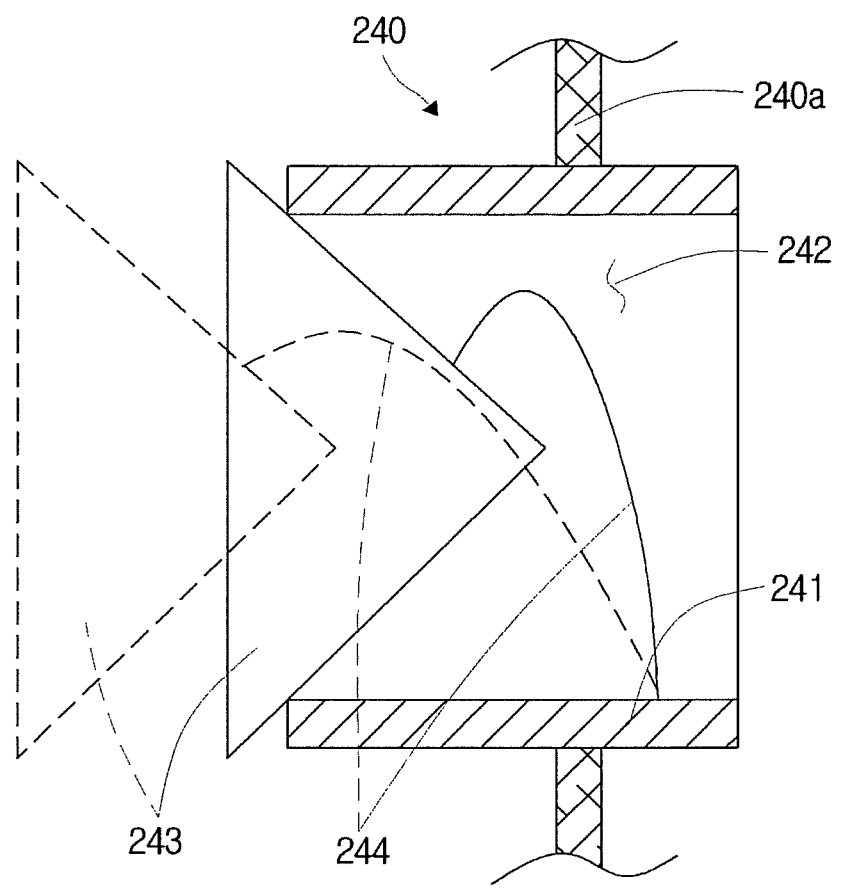
FIG. 20 is a view showing an air-communicating section in a blade, which is applied to a rotor unit of a wind power converting apparatus according to a fourteenth embodiment of the present invention.

FIG. 20 is a view showing an air-communicating section in a blade, which is applied to a rotor unit of a wind power converting apparatus according to a fourteenth embodiment of the present invention.

Referring to FIG. 20, in this embodiment, a through pipe 240 is disposed in each of the through-holes 205*a*, 206*a* and 207*a* shown in FIG. 16.

The through pipe 240 is configured such that both ends of the body 241 thereof protrude predetermined heights from both surfaces of a partition plate 240*a*, and is hollow. An opening/closing member 243, which opens and closes the terminal of a side of the through pipe 240, through which the wind is exhausted, and an elastic member 244, which applies an elastic force to the opening/closing member 243, are additionally provided.

The opening/closing member 243 may have a conical shape.

When the wind flows through the through pipe 240, the opening/closing member 243 opens the through pipe 240 and the elastic member 244 accumulates a restoring force. When no wind flows through the through pipe 240, the opening/closing member 243 is returned to its original position under the restoring force of the elastic member, thereby closing the through pipe 240.

Figure 21:
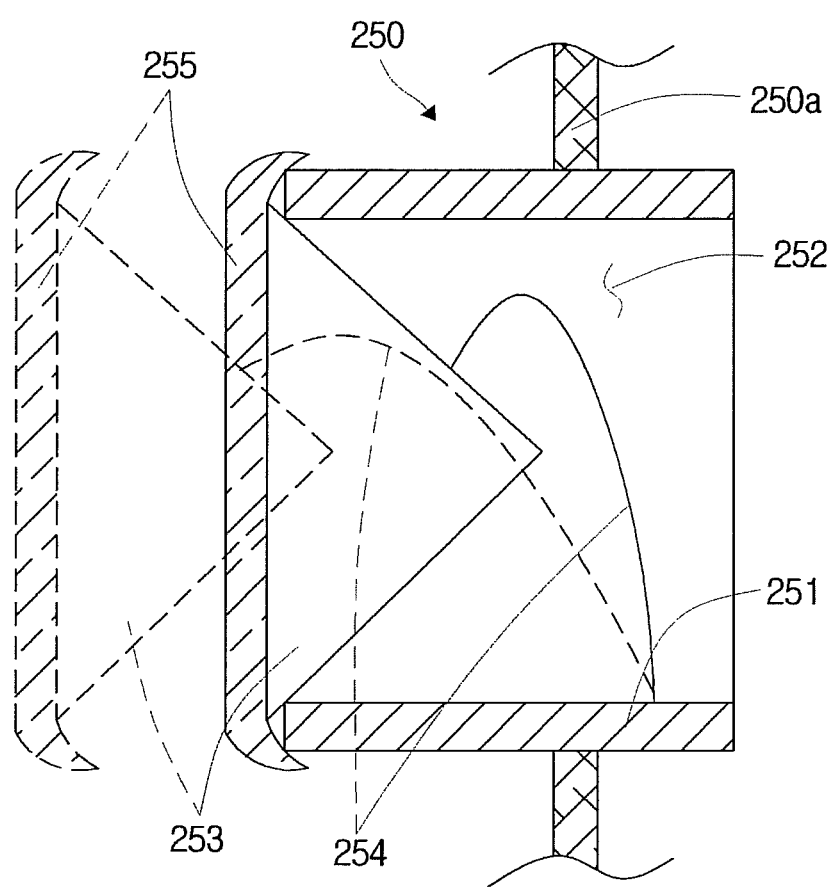
FIG. 21 is a view showing an air-communicating section in a blade, which is applied to a rotor unit of a wind power converting apparatus according to a fifteenth embodiment of the present invention.

FIG. 21 is a view showing an air-communicating section in a blade, which is applied to a rotor unit of a wind power converting apparatus according to a fifteenth embodiment of the present invention.

Referring to FIG. 21, in this embodiment, a through pipe 250 is disposed in each of the through-holes 205a, 206a and 207a shown in FIG. 16.

The through pipe 250 is configured such that both ends of the body 251 thereof protrude predetermined heights from both surfaces of a partition plate 250a, and is hollow. An opening/closing member 253, which opens and closes the terminal of a side of the through pipe 250, through which the wind is exhausted, and an elastic member 254, which applies an elastic force to the opening/closing member 253, are additionally provided. In addition, a cover 255, which is connected to the body of the opening/closing member 253 to cover the exit of the through pipe 250, is provided.

Since the cover 255 is provided, the opening/closing member 253 can completely cover the exit of the through pipe 250.

Figure 22:
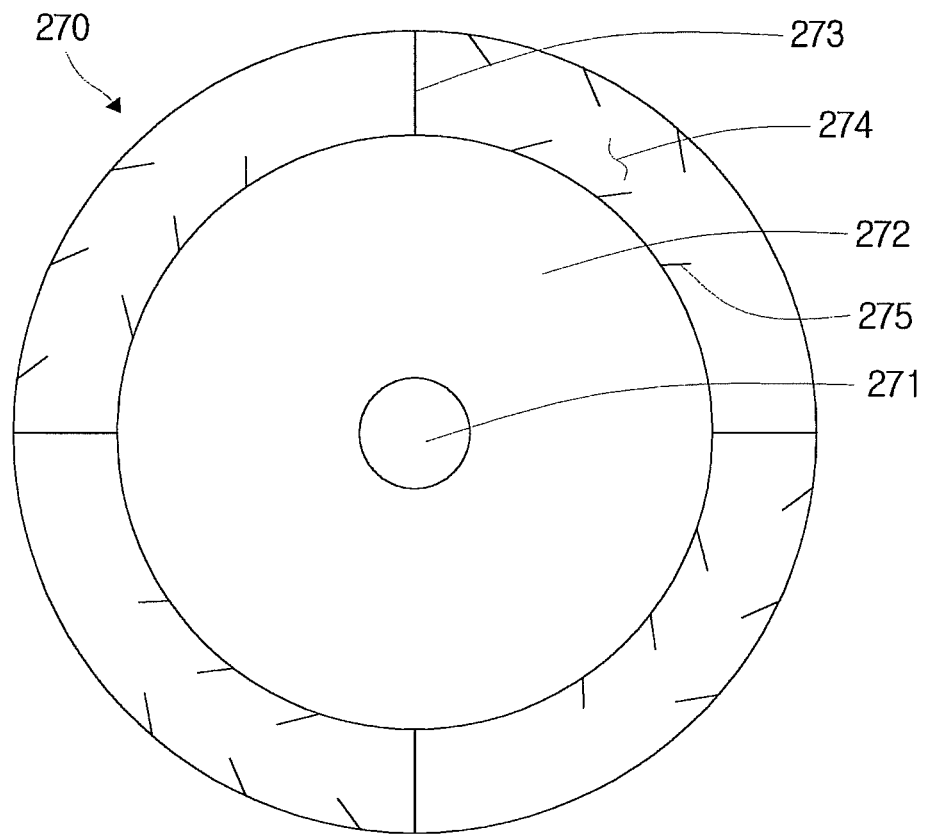
FIG. 22 is a view showing a rotor unit of a wind power converting apparatus according to a sixteenth embodiment of the present invention.

FIG. 22 is a view showing a rotor unit of a wind power converting apparatus according to a sixteenth embodiment of the present invention.

Referring to FIG. 22, in this embodiment, a plurality of partition plates 273 is provided inside a partition plate 272 of a rotor unit 270, forming a plurality of spaces 274, which are partitioned by the partition plates 273.

A liquid such as an anti-freezing solution is disposed inside the partitioned spaces 274.

In the partitioned spaces 274, a plurality of resistant fins 275 protrudes into each partitioned space 274 from the outer circumference of the partitioned space 274. The resistant fins 275 may protrude at an incline in the direction that is opposite to the direction in which the rotor unit 270 rotates.

When the partition plates 273 are rotated, the liquid is collected in one portion of each partitioned spaces 274, i.e. in the direction that is opposite to the direction in which the partition plates 273 are rotated. When the rotational force of the partition plates 273 is decreased, the liquid is collected in the other portion of the partitioned space 274, i.e. in the direction in which the partition plates 273 are rotated. In both cases, the collected liquid collides against the resistant fins 275, so that the rotational force of the rotor unit 270 can be increased, thereby increasing operating efficiency.

In the meantime, at least one globular weight may be contained inside the partitioned space 274, such that the globular weight increases the rotational force of the rotor unit 270.

Figure 23:
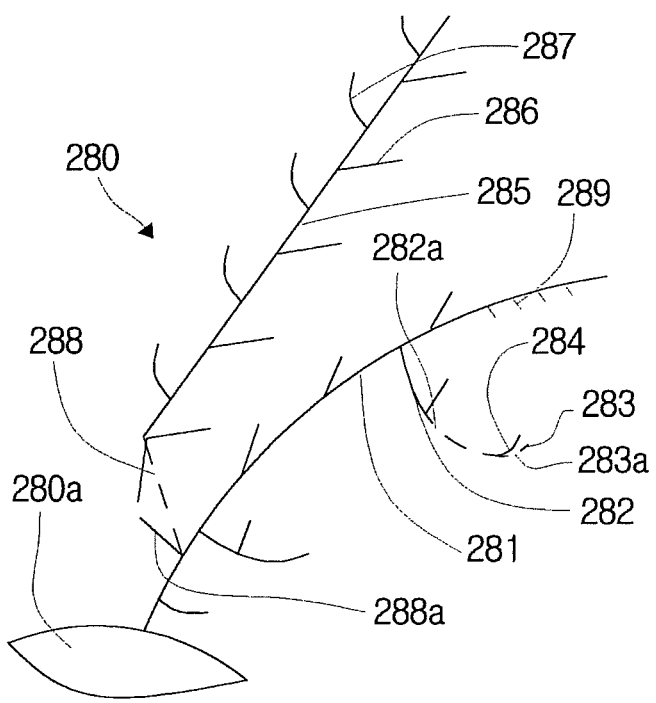
FIG. 23 is a view showing a rotary blade, which is applied to a wind power converting apparatus according to a seventeenth embodiment of the present invention.
Figure 24:
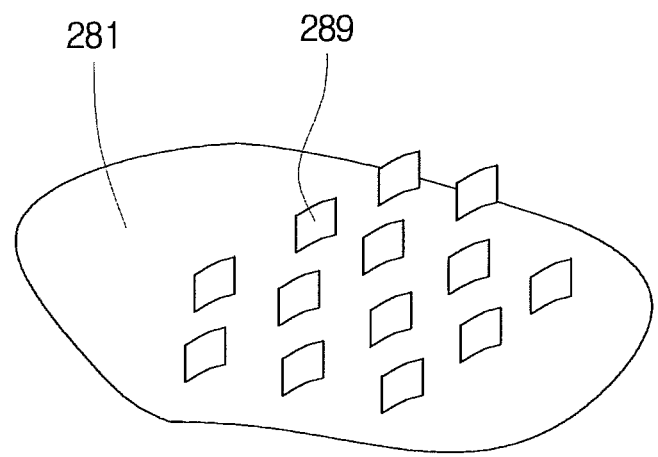
FIG. 24 is an enlarged view of part of the rotary blade, which is applied to the wind power converting apparatus according to the seventeenth embodiment of the present invention.

FIG. 23 is a view showing a rotary blade, which is applied to a wind power converting apparatus according to a seventeenth embodiment of the present invention, and FIG. 24 is an enlarged view of part of the rotary blade, which is applied to the wind power converting apparatus according to the seventeenth embodiment of the present invention.

Referring to FIG. 23 and FIG. 24 together, in this embodiment, a rotary blade assembly 280 includes a plurality of rotary blades 281 and 285. A plurality of auxiliary blades 282, 286, 287 and 289 is formed in each of the rotary blades 281 and 285. The auxiliary blades 282, 286, 287 and 289 may be presented in various shapes. For example, the auxiliary blade 282 has a screen 284, which prevents the wind from blowing back into a through-hole 283a thereof. The auxiliary blade 286 is linear, and the auxiliary blade 287 is curved. The multiple auxiliary blades 289 are arranged in multiple rows, such that, in two adjacent rows of the auxiliary blades, the auxiliary blades of one row are arranged in positions corresponding to the intervals of the auxiliary blades of the other row.

A wind outlet 288 is formed in the portion in which the rotary blades 281 and 285 are coupled to each other. The wind that has passed by the rotary blades 281 and 285 can be exhausted through the wind outlet 288. A screen 288a, which can open or close the outlet 288, may also be provided.

The rotary blade assembly 280 configured as above can increase the rotational force of the rotary blade assembly 280, such that the operating efficiency of the rotary blade assembly 280 is increased.

Figure 25:
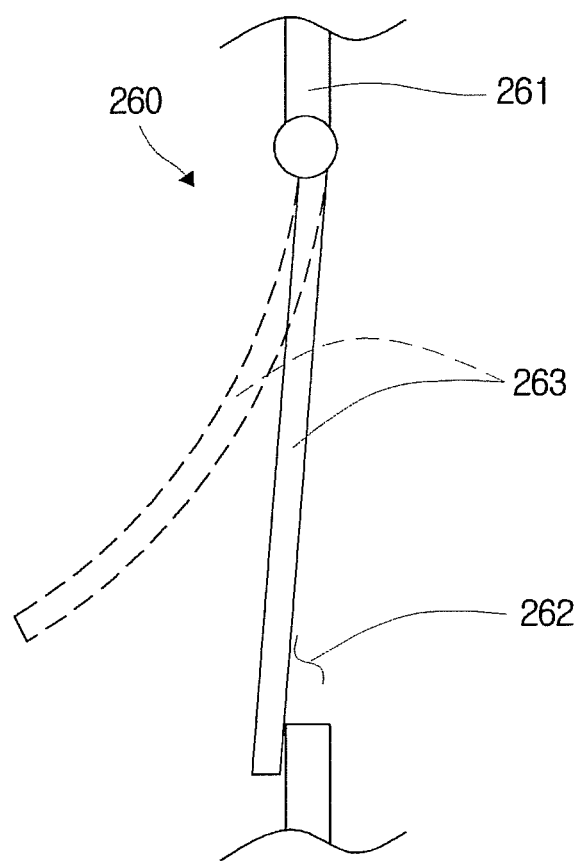
FIG. 25 is a view showing a screen, which is applied to a wind power converting apparatus according to an eighteenth embodiment of the present invention, the screen closing a hole in a coupling portion of a rotary blade.

FIG. 25 is a view showing a screen, which is applied to a wind power converting apparatus according to an eighteenth embodiment of the present invention, the screen closing a hole in a coupling portion of a rotary blade.

Referring to FIG. 25, in this embodiment, there is provided a screen 263, which closes a through-hole 262, which corresponds to the through-hole 283a shown in FIG. 23 and FIG. 24.

The screen 263 is elastic. That is, when the wind flows through the through-hole 262, the screen 263 is bent to open the through-hole 262 while accumulating a restoring force. When no wind flows through the through-hole 262, the screen 263 is returned to its original state by the restoring force, thereby closing the through-hole 262.

Figure 26:
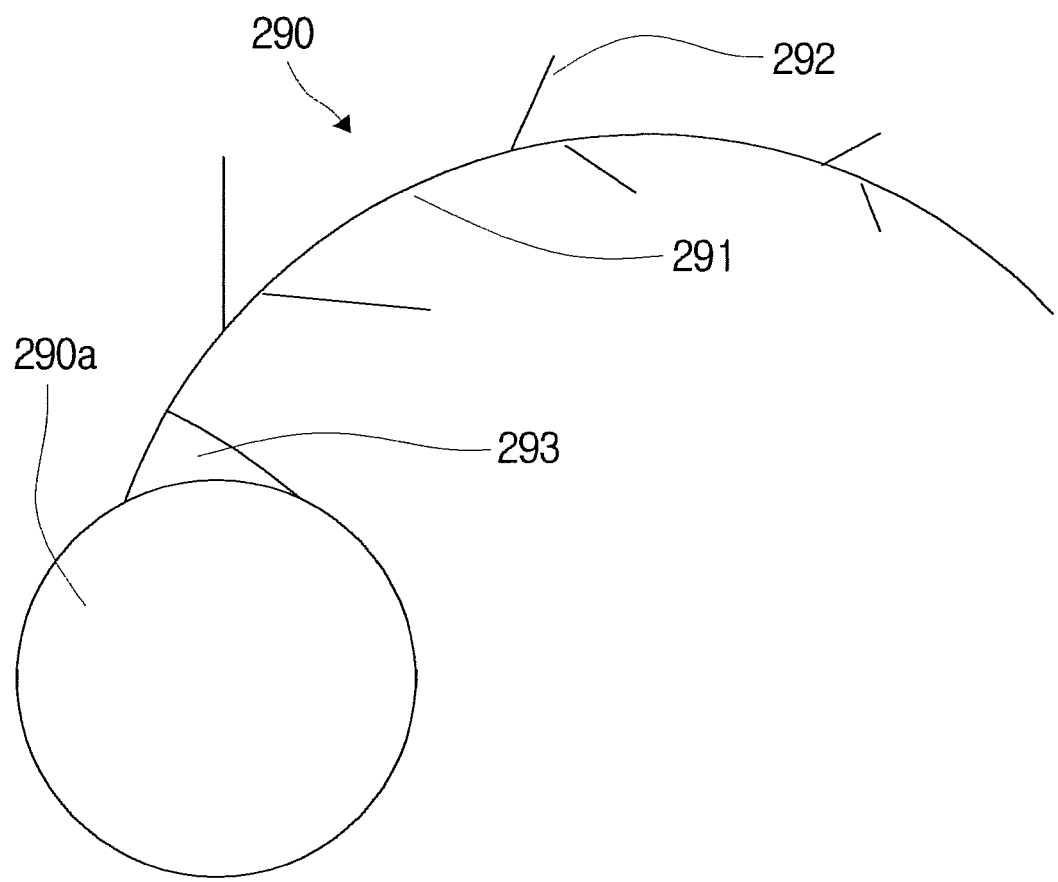
FIG. 26 is a view showing a rotary blade, which is applied to a rotor unit of a wind power converting apparatus according to a nineteenth embodiment of the present invention.
Figure 52:
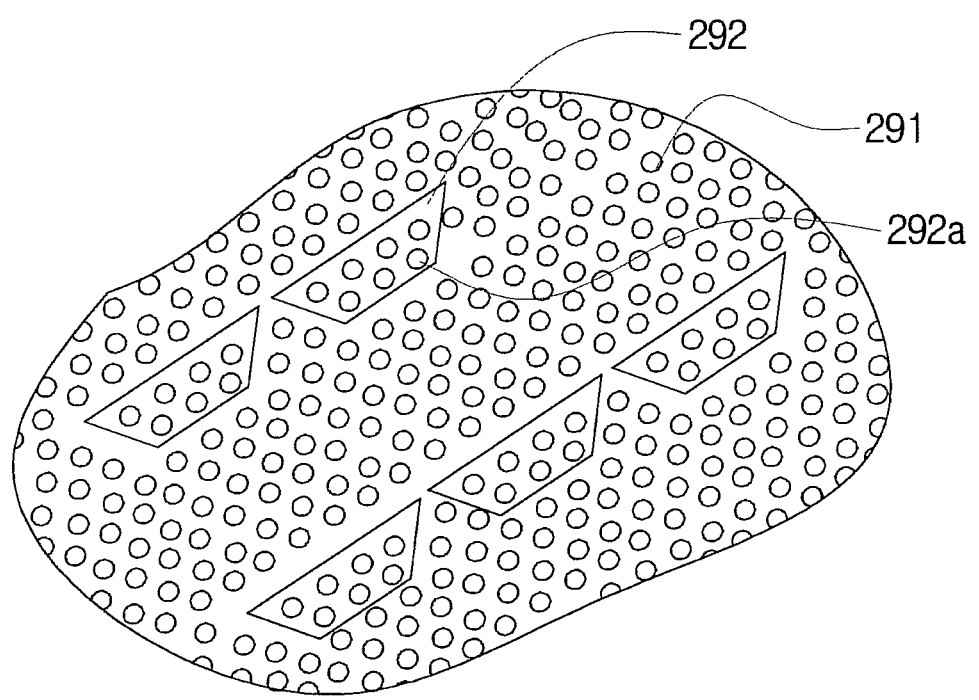
FIG. 52 is an enlarged view showing auxiliary blades of the rotary blade, which is applied to the rotor unit of the wind power converting apparatus according to the nineteenth embodiment of the present invention.

FIG. 26 is a view showing a rotary blade, which is applied to a rotor unit of a wind power converting apparatus according to a nineteenth embodiment of the present invention, and FIG. 52 is an enlarged view showing auxiliary blades of the rotary blade, which is applied to the rotor unit of the wind power converting apparatus according to the nineteenth embodiment of the present invention.

Referring to FIG. 26 and FIG. 52 together, in this embodiment, a plurality of auxiliary blades 292 having different heights are provided on a rotary blade 291 of a rotor unit 290. It is preferred that the auxiliary blades 292 be configured such that the heights decrease in the direction toward the upper end of the rotary blade 291.

A reinforcing portion 293 may be provided in the portion in which the rotary blade 291 is connected to a rotary shaft 290a.

In this embodiment, the auxiliary blades 293 form a plurality of rows, which are arranged in a staggered manner. In addition, a plurality of recesses 292a may be formed on respective auxiliary blades 293. The recesses 292a are arranged in a staggered manner, such that they increase an area, which is exposed to the wind, thereby increasing operating efficiency. The recesses 292a may be formed in the surface, which is exposed to the wind.

In addition, a plurality of recesses 291a may also be formed in the surface of the rotary blade 291, thereby increasing an area, which is exposed to the wind.

Figure 27:
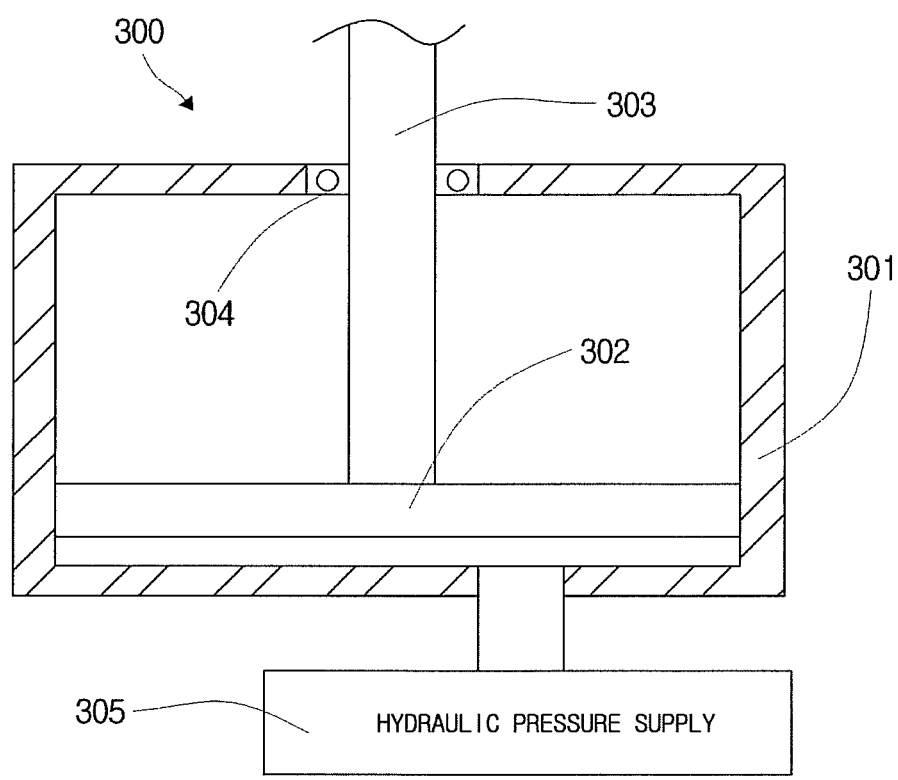
FIG. 27 is a view showing an elevator unit for a rotary blade, which is applied to a rotor unit of a wind power converting apparatus according to a twentieth embodiment of the present invention.

FIG. 27 is a view showing an elevator unit for a rotary blade, which is applied to a rotor unit of a wind power converting apparatus according to a twentieth embodiment of the present invention.

Referring to FIG. 27, in this embodiment, an elevator unit 300, which drives a rotary blade assembly up and down, is additionally provided.

The elevator unit 300 includes a cylinder 301 and a piston 302, which is driven up and down inside the cylinder 301. An elevator shaft 303 is connected to the piston 302 and to the rotary shaft of the rotary blade assembly. A bearing 304 allows the elevator shaft 303 to smoothly rotate about the cylinder 301, and a hydraulic pressure supply 305 supplies hydraulic pressure into the cylinder 301.

When the elevator shaft 303 is raised by the hydraulic pressure, which is supplied from the hydraulic pressure supply 305, the rotary shaft of the rotary blade assembly is also raised. Since the rotary blade assembly can rotate in the raised state, it can rotate smoothly.

In addition, since the use of the bearing is minimized, the rotation of the rotary blade assembly can be realized more smoothly.

Figure 28:
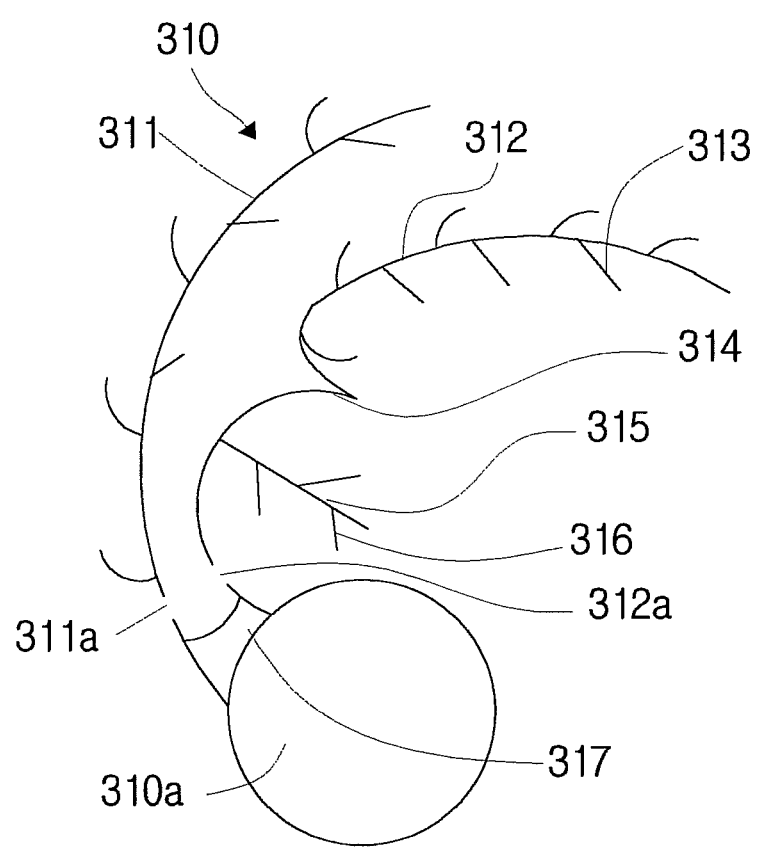
FIG. 28 is a view showing a rotary blade, which is applied to a rotor unit of a wind power converting apparatus according to a twenty-first embodiment of the present invention.

FIG. 28 is a view showing a rotary blade, which is applied to a rotor unit of a wind power converting apparatus according to a twenty-first embodiment of the present invention.

Referring to FIG. 28, in this embodiment, a rotary blade assembly 310 is provided with a wind resistant portion 314.

The wind resistant portion 314 is defined by a protruding portion of the rotary blade 312 of the rotary blade assembly 310, such that it can resist the wind, thereby increasing the rotational force of the rotary blade assembly 310.

In addition, an additional stem blade 315 extends from the rotary blade 312. The additional stem blade 315 may be provided with a plurality of auxiliary blades 316, such that the rotational force of the rotary blade 312 is further increased.

Figure 29:
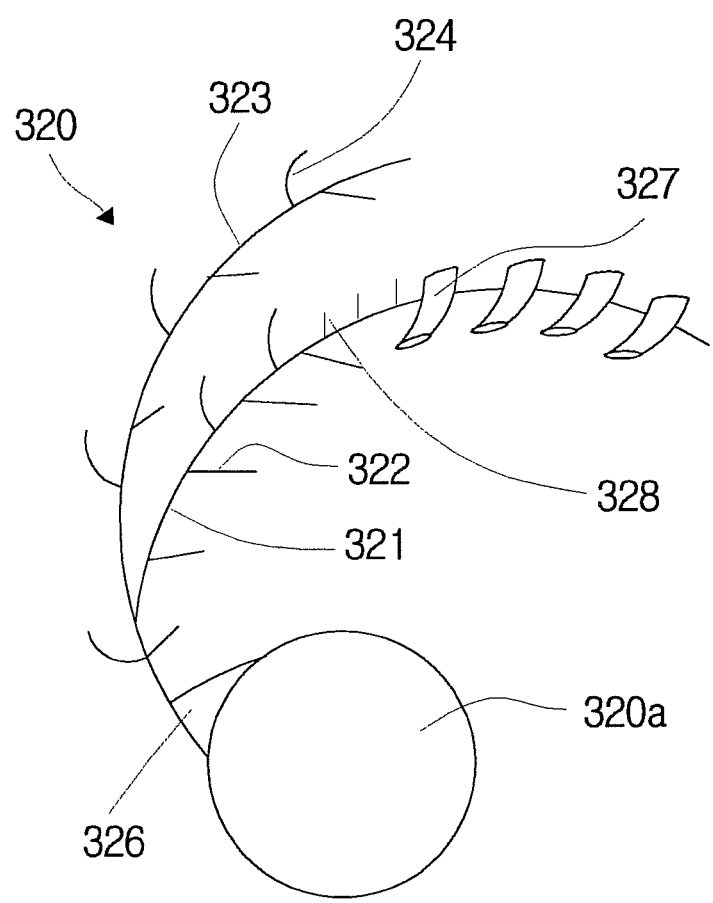
FIG. 29 is a view showing a rotary blade, which is applied to a rotor unit of a wind power converting apparatus according to a twenty-second embodiment of the present invention.
Figure 30:
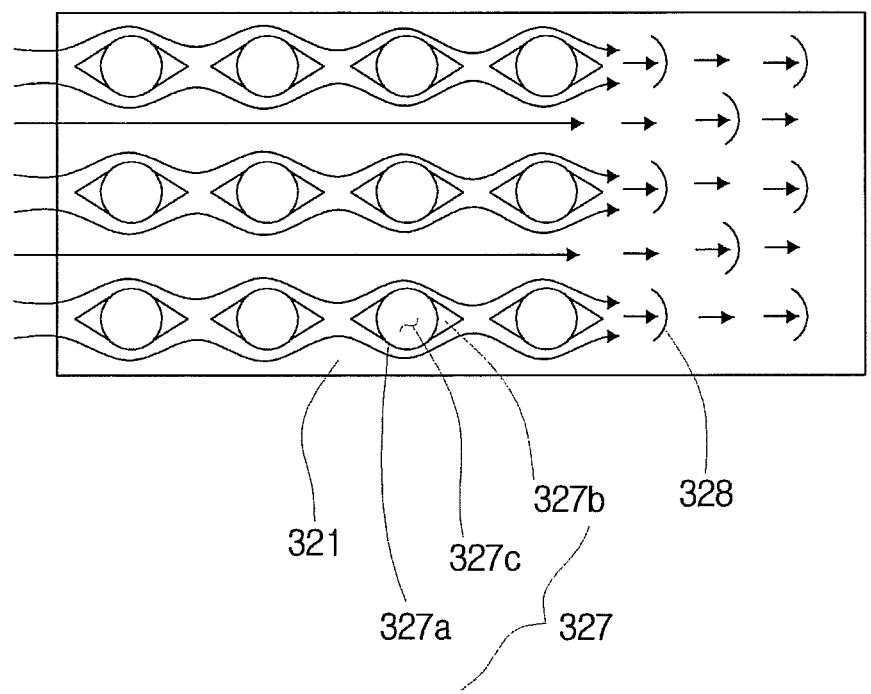
FIG. 30 is an enlarged view of part of the rotary blade, which is applied to the rotor unit of the wind power converting apparatus according to the twenty-second embodiment of the present invention.
Figure 53:
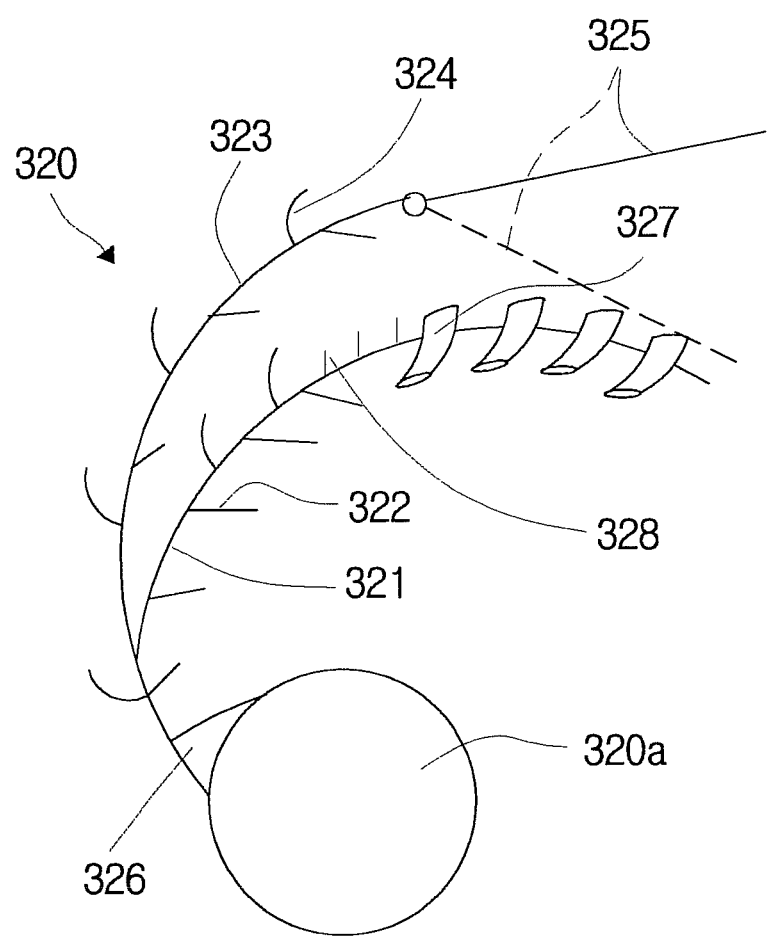
FIG. 53 is a view showing another shape of the rotary blade, which is applied to the rotor unit of the wind power converting apparatus according to the twenty-second embodiment of the present invention.

FIG. 29 is a view showing a rotary blade, which is applied to a rotor unit of a wind power converting apparatus according to a twenty-second embodiment of the present invention, FIG. 53 is a view showing another shape of the rotary blade, which is applied to the rotor unit of the wind power converting apparatus according to the twenty-second embodiment of the present invention, and FIG. 30 is an enlarged view of part of the rotary blade, which is applied to the rotor unit of the wind power converting apparatus according to the twenty-second embodiment of the present invention.

Referring to FIG. 29 to FIG. 30, in this embodiment, a rotary blade assembly 320 includes a plurality of rotary blades 321 and 323 and an opening/closing member 325, which opens or closes the area between adjacent ones of the multiple rotary blades 321 and 323.

The multiple rotary blades 321 and 323 may form multiple pairs, each of which consists of at least two rotary blades, and such pairs may be applied to the rotary blade assembly 320.

The opening/closing member 325 is rotatably connected to the rotary blade 323 in one side, such that it covers the rotary blade 321 in the other side, thereby opening or closing the area between the adjacent rotary blades 323 and 321.

The rotary blade 321 includes wind guide pipes 327, which extend through the rotary blade 321.

The wind guide pipes 327 extend through the rotary blade 321 so as to guide the wind therethrough. As shown in FIG. 30, the wind can flow through the through-holes 327c, or can be guided along the outline of the body 327a. The body 327a is configured such that it is higher than the front and rear portions 327b, thereby preventing the wind from blowing back.

Auxiliary blades 328 are arranged along the flow path of the wind, behind the wind guide pipes 327, such that they can resist the wind to increase rotational force.

Figure 31:
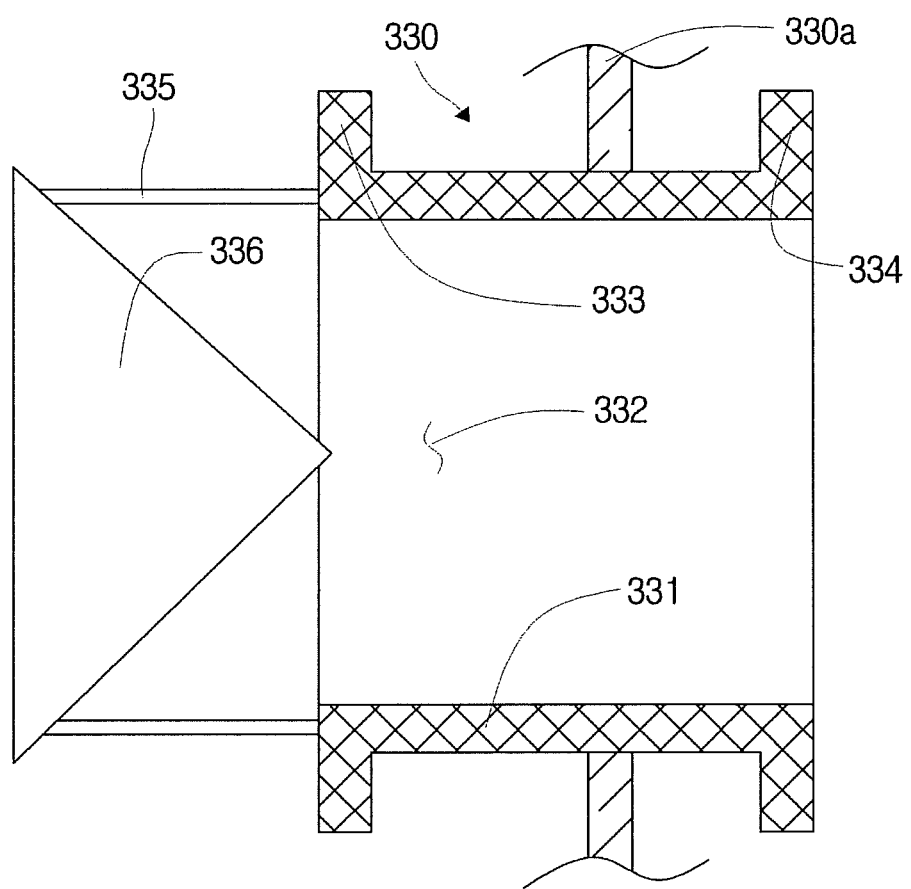
FIG. 31 is a view showing an air-communicating section in a blade, which is applied to a rotor unit of a wind power converting apparatus according to a twenty-third embodiment of the present invention.

FIG. 31 is a view showing an air-communicating section in a blade, which is applied to a rotor unit of a wind power converting apparatus according to a twenty-third embodiment of the present invention.

Referring to FIG. 31, in this embodiment, a wind guide pipe 330, which corresponds to the wind guide pipe 327 shown in FIG. 30, is presented.

The wind guide pipe 330 includes a conical backflow prevention cover 336, which prevents the wind from blowing back in an outlet of the wind guide pipe 330, and an interval-forming member 335, which forms an interval between the outlet of the wind guide pipe 330 and the backflow prevention cover 336 so as to form an outlet passage for the wind between the outlet of the wind guide pipe 330 and the backflow prevention cover 336. Accordingly, the wind efficiently passes, and is prevented from blowing back.

Figure 32:
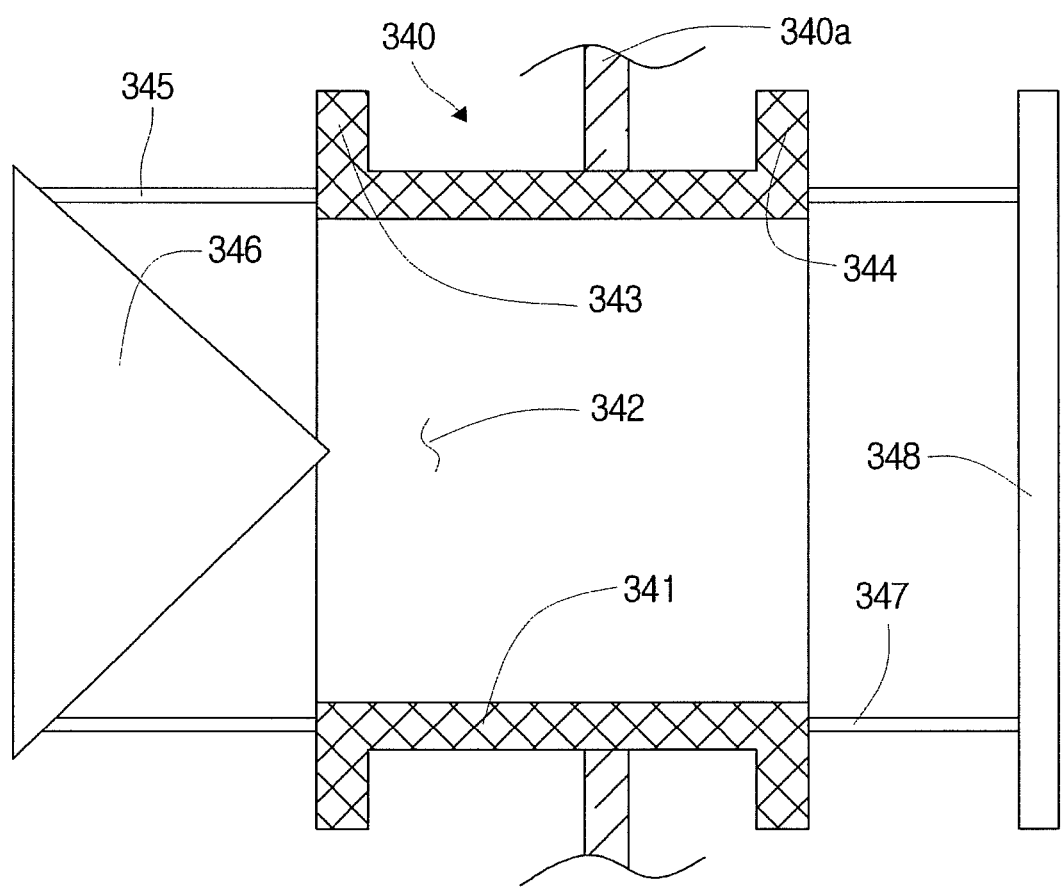
FIG. 32 is a view showing an air-communicating section in a blade, which is applied to a rotor unit of a wind power converting apparatus according to a twenty-fourth embodiment of the present invention.

FIG. 32 is a view showing an air-communicating section in a blade, which is applied to a rotor unit of a wind power converting apparatus according to a twenty-fourth embodiment of the present invention.

Referring to FIG. 32, in this embodiment, a wind guide pipe 340, which corresponds to the wind guide pipe 330 shown in FIG. 31, is presented.

The wind guide pipe 340 includes a backflow prevention cover 348, which has the form of a flat plate to prevent the wind from blowing back in an inlet of the wind guide pipe 340, and an interval-forming member 347, which forms an interval between the backflow prevention cover 348 and the wind guide pipe 340 so as to form an outlet passage for the wind between the backflow prevention cover 348 and the wind guide pipe 340. Accordingly, the wind efficiently passes, and is prevented from blowing back.

Figure 33:
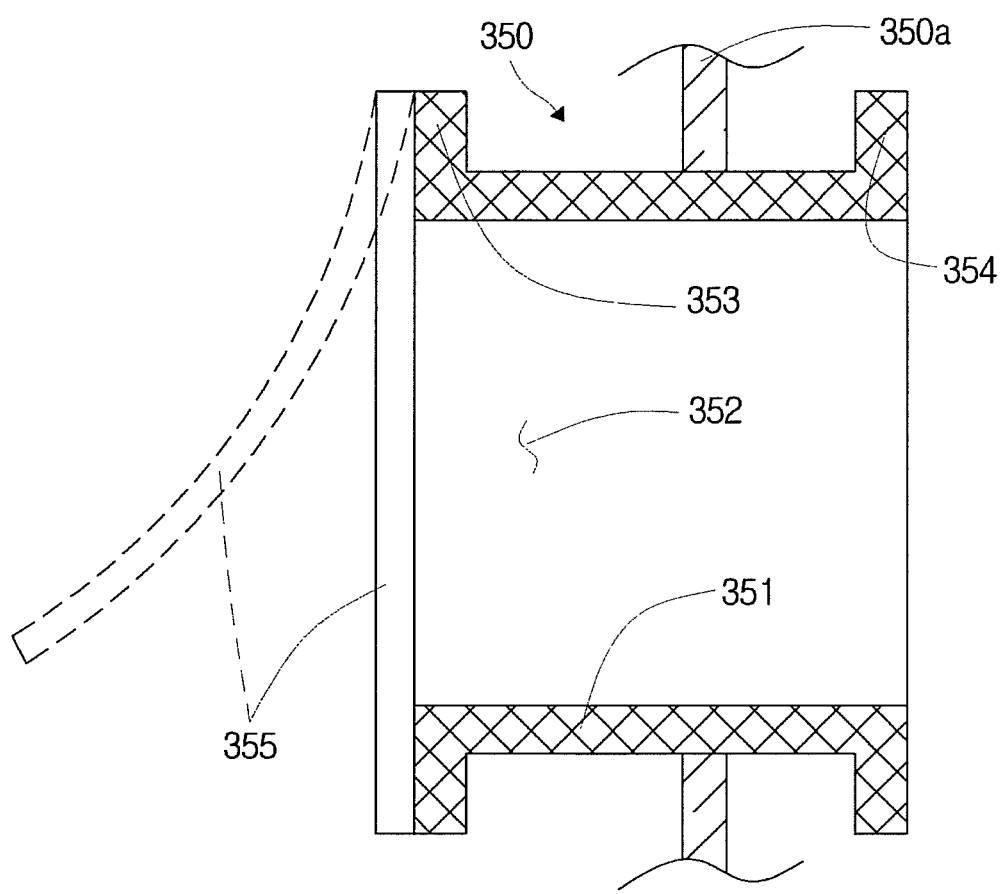
FIG. 33 is a view showing an air-communicating section in a blade, which is applied to a rotor unit of a wind power converting apparatus according to a twenty-fifth embodiment of the present invention.

FIG. 33 is a view showing an air-communicating section in a blade, which is applied to a rotor unit of a wind power converting apparatus according to a twenty-fifth embodiment of the present invention.

Referring to FIG. 33, in this embodiment, a wind guide pipe 350, which corresponds to the wind guide pipe 327 shown in FIG. 30, is presented.

The wind guide pipe 350 includes an elastic backflow prevention cover 355, which prevents the wind from blowing back in an outlet of the wind guide pipe 350. The backflow prevention cover 355 is opened when the wind blows, and returns to its original state using a restoring force when the wind becomes weak.

Figure 34:
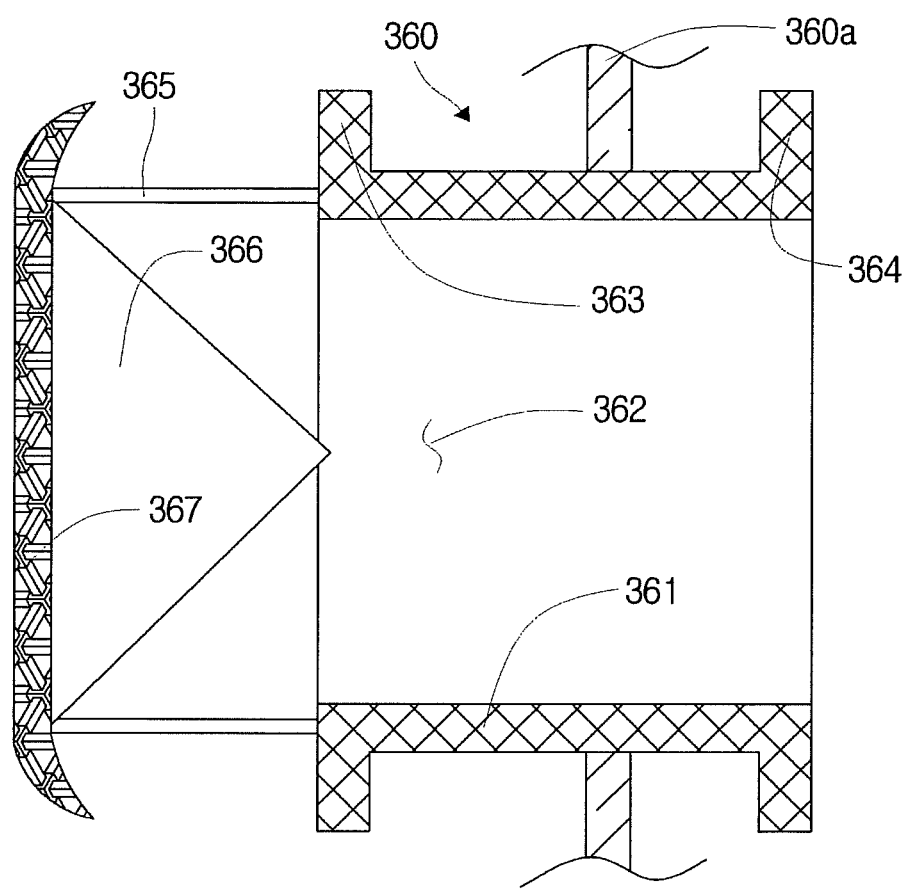
FIG. 34 is a view showing an air-communicating section in a blade, which is applied to a rotor unit of a wind power converting apparatus according to a twenty-sixth embodiment of the present invention.

FIG. 34 is a view showing an air-communicating section in a blade, which is applied to a rotor unit of a wind power converting apparatus according to a twenty-sixth embodiment of the present invention.

Referring to FIG. 34, in this embodiment, a wind guide pipe 360, which corresponds to the wind guide pipe 330 shown in FIG. 31, is presented.

The wind guide pipe 360 has a backflow prevention flange 367, which extends from a conical backflow prevention cover 366 in the outlet side. The effect of preventing the wind from blowing back can be enhanced by the backflow prevention flange 367.

Figure 35:
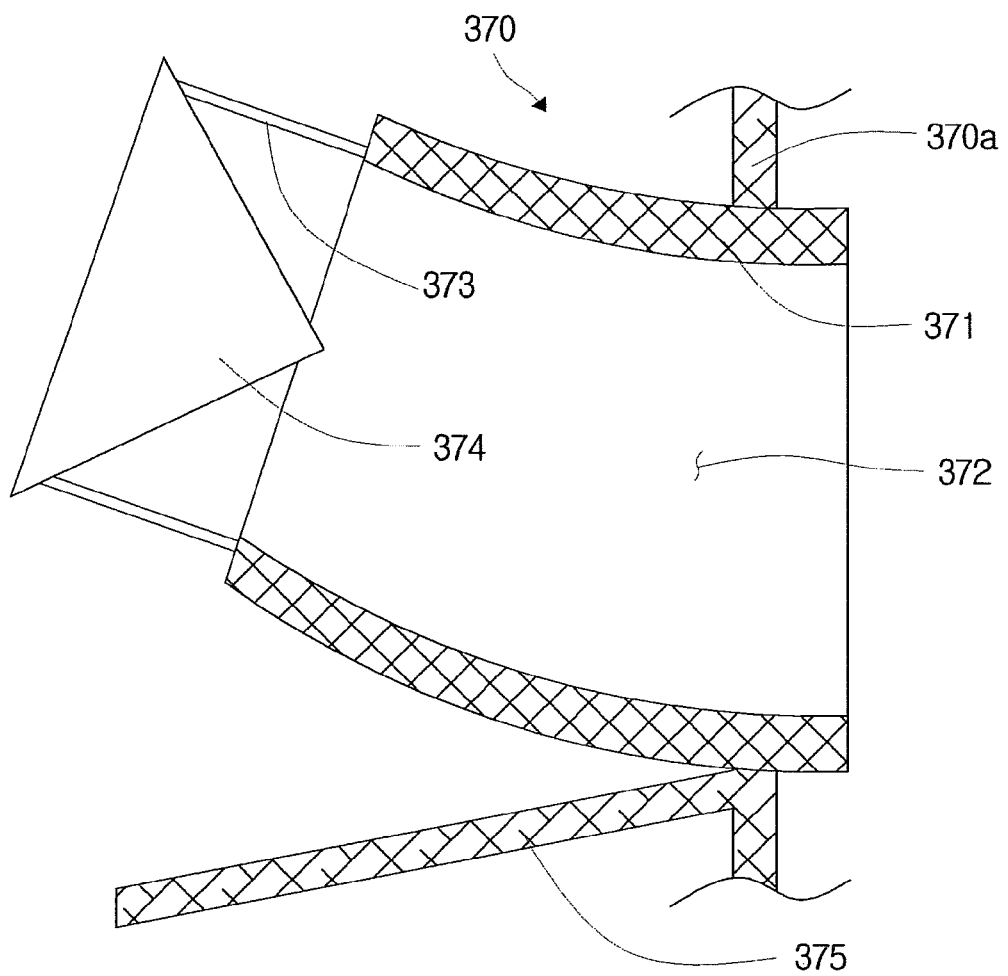
FIG. 35 is a view showing an air-communicating section in a blade, which is applied to a rotor unit of a wind power converting apparatus according to a twenty-seventh embodiment of the present invention.

FIG. 35 is a view showing an air-communicating section in a blade, which is applied to a rotor unit of a wind power converting apparatus according to a twenty-seventh embodiment of the present invention.

Referring to FIG. 35, in this embodiment, a wind guide pipe 370, which corresponds to the wind guide pipe 327 shown in FIG. 30, is presented.

The wind guide pipe 370 is configured such that it is bent in one direction, and an auxiliary blade 375 is provided on a portion of the wind guide pipe 370. This can consequently prevent a backflow in the wind guide pipe 370 while increasing a rotational force.

Figure 36:
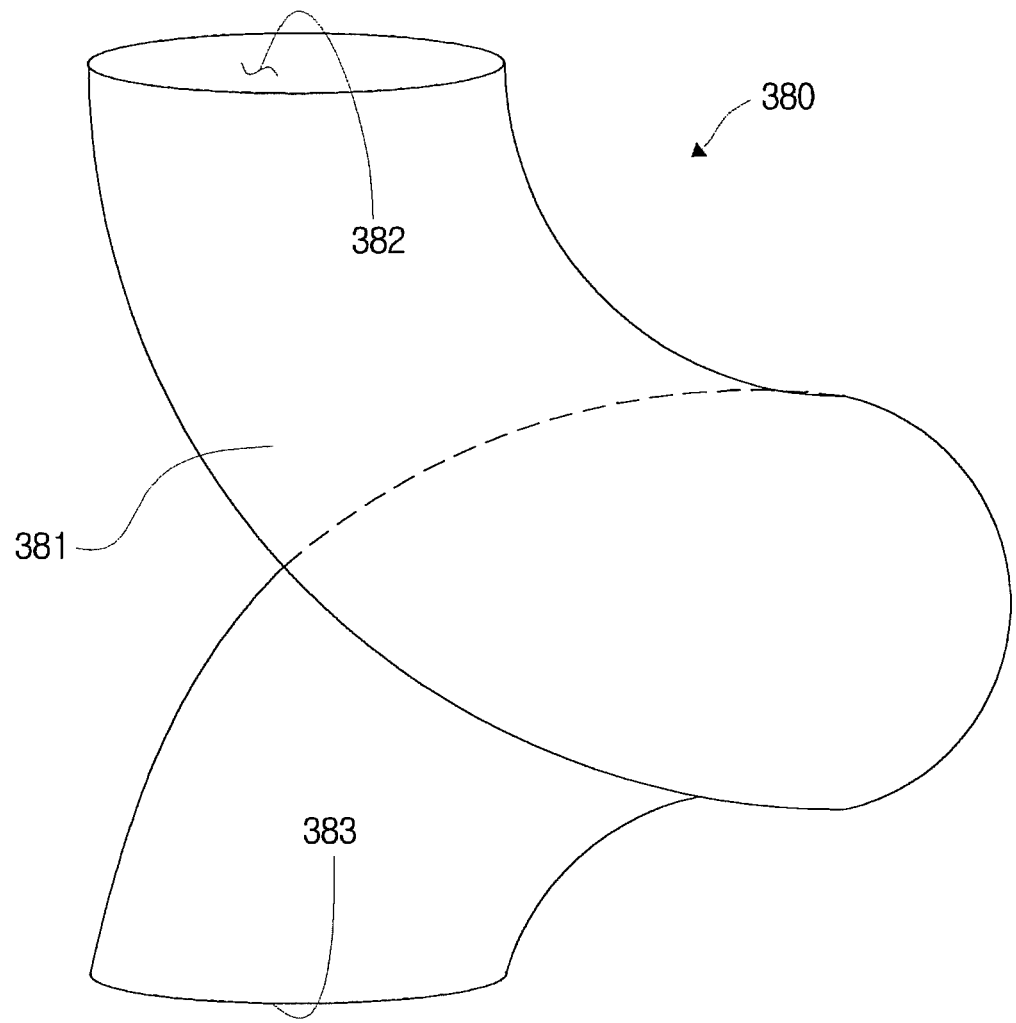
FIG. 36 is a view showing an air-communicating section in a blade, which is applied to a rotor unit of a wind power converting apparatus according to a twenty-eighth embodiment of the present invention.

FIG. 36 is a view showing an air-communicating section in a blade, which is applied to a rotor unit of a wind power converting apparatus according to a twenty-eighth embodiment of the present invention.

Referring to FIG. 36, in this embodiment, a wind guide pipe 380, which corresponds to the wind guide pipe 327 shown in FIG. 30, is presented.

The wind guide plate 380 has a spiral shape, which causes resistance to the wind that is passing through the wind guide plate 380. This can consequently increase the rotational force of a rotary blade assembly, thereby increasing operating efficiency.

Figure 37:
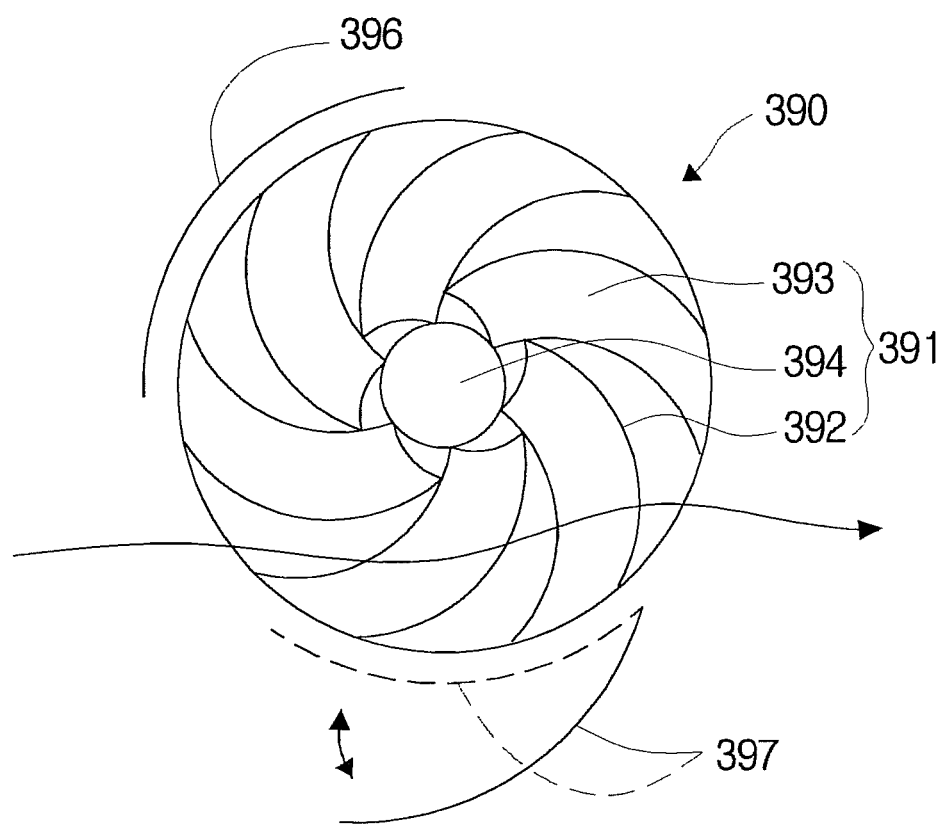
FIG. 37 is a view showing the flow of air in a rotor unit of a wind power converting apparatus according to a twenty-ninth embodiment of the present invention.

FIG. 37 is a view showing the flow of air in a rotor unit of a wind power converting apparatus according to a twenty-ninth embodiment of the present invention.

Referring to FIG. 37, in this embodiment, a rotor unit 390 includes a rotary blade assembly 391, a cover 396 surrounding part of the rotary blade assembly 391, the lower end of the cover 396 being open, and a wind guide 397 disposed at the lower end of the cover 396, such that it can open or close the lower end of the cover 396.

In this embodiment, the wind is introduced through the front portion of the lower end of the cover 396, passes through the rotary blade assembly 391, and is then exhausted through the rear portion of the lower end of the cover 396.

Figure 38:
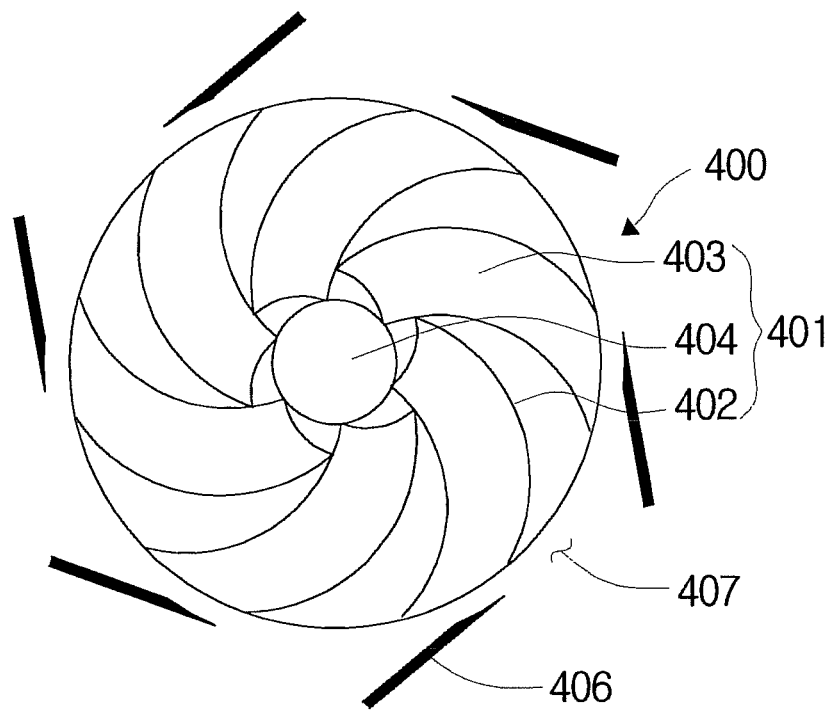
FIG. 38 is a view showing the flow of air in a rotor unit of a wind power converting apparatus according to a thirtieth embodiment of the present invention.

FIG. 38 is a view showing the flow of air in a rotor unit of a wind power converting apparatus according to a thirtieth embodiment of the present invention.

Referring to FIG. 38, in this embodiment, a rotor unit 400 includes a rotary blade assembly 401 and a fixing cover 406.

The fixing cover 406 is fixed to the place in which the rotor unit 400 is disposed, and has a plurality of wind flow holes 407. Through a plurality of the wind flow holes 407, the wind can be applied to the rotary blade assembly 401, which is inside.

Figure 39:
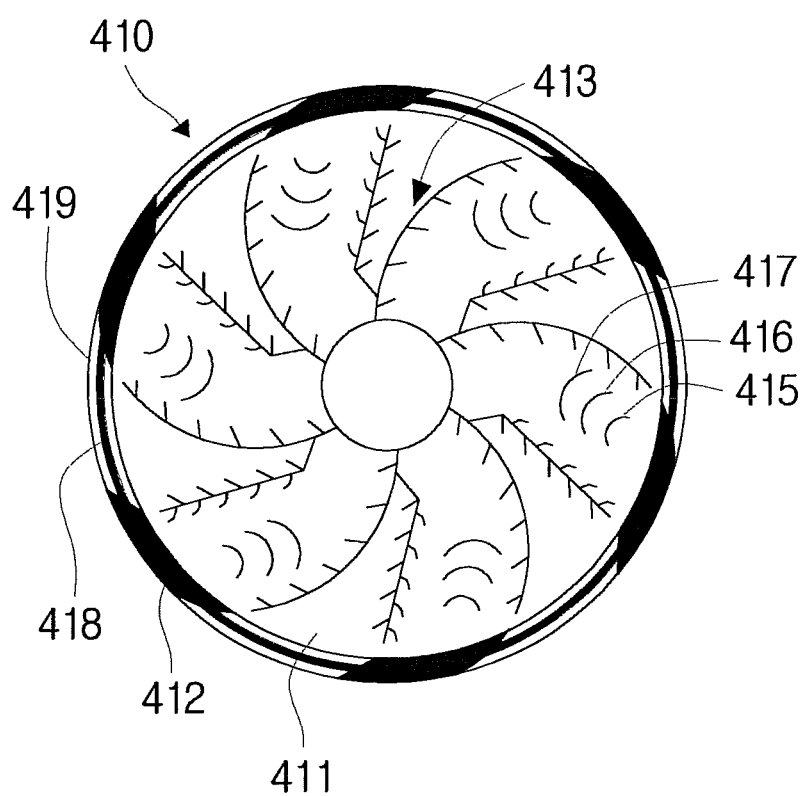
FIG. 39 is a view showing a rotor unit of a wind power converting apparatus according to a thirty-first embodiment of the present invention.

FIG. 39 is a view showing a rotor unit of a wind power converting apparatus according to a thirty-first embodiment of the present invention.

Referring to FIG. 39, in this embodiment, weights 412 are movably disposed on a rail 419, which is on the outer circumference of a partition plate 411 of a rotor unit 410.

The weights 412 are provided in multiple numbers, and are connected together by connectors 418. The weights 412 can move on the rail 419 in the state in which they are connected together by the connectors 418. When the rotor unit 410 rotates, the rotational force of the rotor unit 410 can be increased due to inertia.

Figure 40:
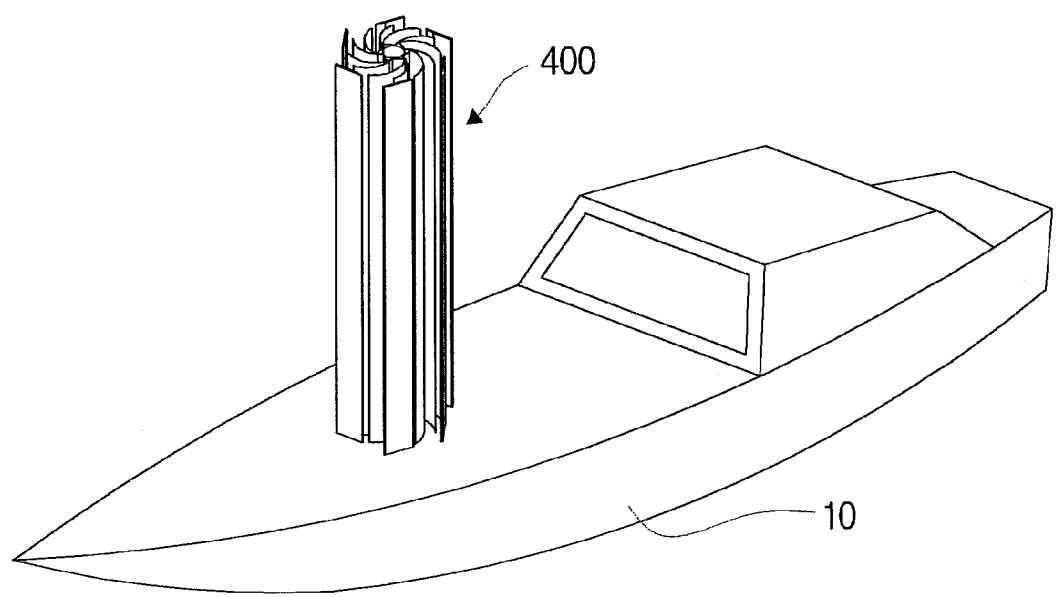
FIG. 40 is a view showing the rotor unit of the wind power converting apparatus according to the thirtieth embodiment of the present invention, which is applied to a ship.

FIG. 40 is a view showing the rotor unit of the wind power converting apparatus according to the thirtieth embodiment of the present invention, which is applied to a ship.

Referring to FIG. 40, as shown in the figure, the rotor unit 400 of this embodiment is applied to a ship 10, such that it can function as a sail to move the ship while generating electricity from wind power to provide energy to the ship 10.

For example, the rotor unit 400 can operate such that it maintains a fixed shape without rotating when functioning as the sail to move the ship and rotates when functioning as a power source for the ship 10.

In the meantime, when the rotor unit 400 is configured as a multi-stage structure because of a partition plate or the like, the width of a rotary blade, which is adjacent to the deck of the ship 10, may be formed to be narrower relative to that of a rotary blade in the other side. Then, even if the rotor unit 400 is disposed on the ship 10, it is possible to minimize the chance that the rotor unit 400 obstructs the movement of an occupant on the deck of the ship 10.

Figure 41:
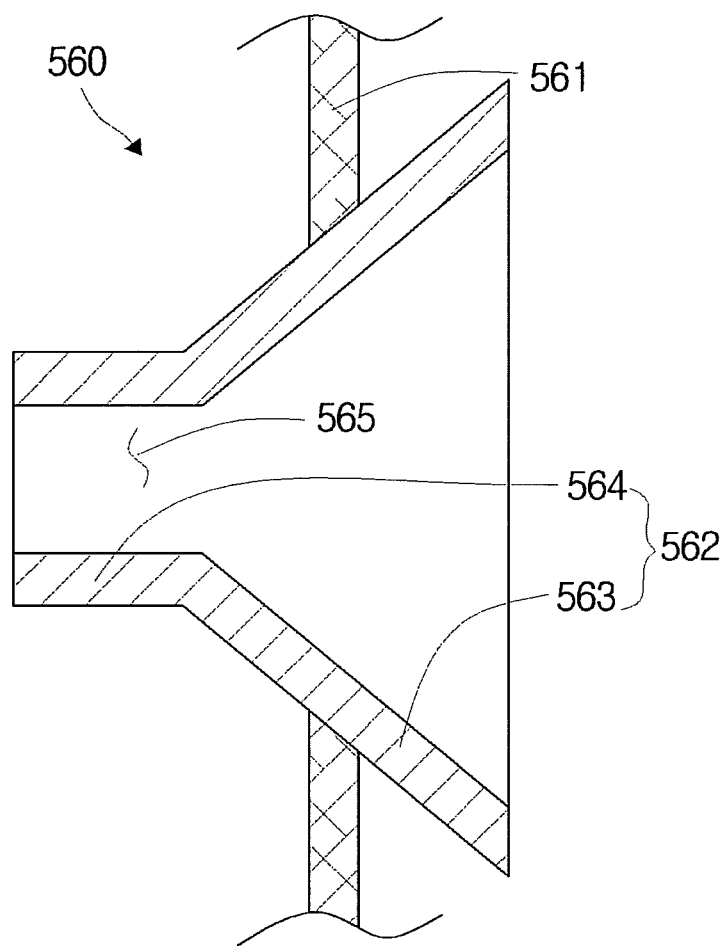
FIG. 41 is a view showing an air-communicating section in a blade, which is applied to a rotor unit of a wind power converting apparatus according to a thirty-second embodiment of the present invention.

FIG. 41 is a view showing an air-communicating section in a blade, which is applied to a rotor unit of a wind power converting apparatus according to a thirty-second embodiment of the present invention.

Referring to FIG. 41, in this embodiment, a wind guide pipe 562, which corresponds to the wind guide pipe 327 shown in FIG. 30, is presented.

The wind guide pipe 562 extends through a rotary blade 561 so as to guide the wind therethrough, such that the wind can blow through a through-hole 565 of the wind guide pipe 562.

The body of the wind guide pipe 562 has an overall funnel-like shape. Specifically, the body of the wind guide pipe 562 includes a converging portion 563, with the diameter of the inlet side through which the wind being introduced being relatively greater than that of the outlet side through which the wind is exhausted, and an extension 564 extending from one end of the converging portion 563, the extension 564 having a constant diameter.

Since the wind guide pipe 562 has the funnel-like shape, the wind that is passing through the wind guide pipe 562 forms vortexes, thereby further increasing the rotational force of the rotary blade 561.

Figure 42:
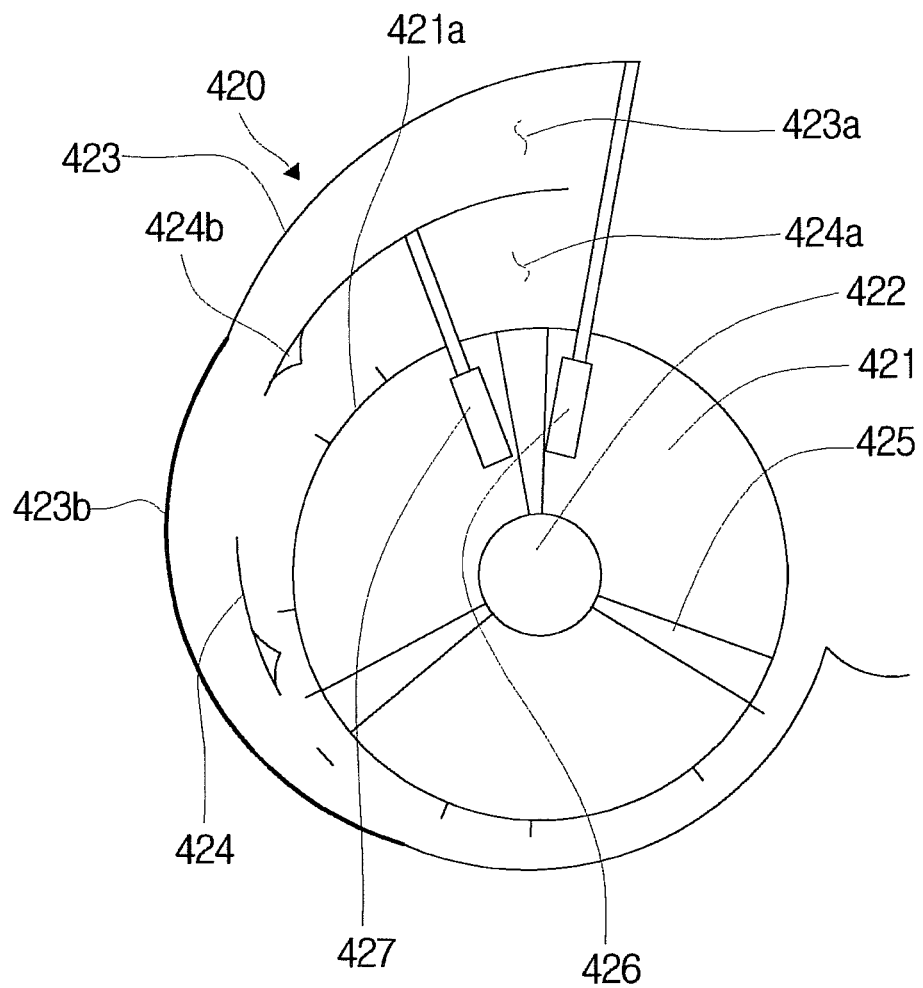
FIG. 42 is a view showing a rotor unit of a wind power converting apparatus according to a thirty-third embodiment of the present invention.

FIG. 42 is a view showing a rotor unit of a wind power converting apparatus according to a thirty-third embodiment of the present invention.

Referring to FIG. 42, a rotor unit 420 of this embodiment has an elastically deformable portion 423b in a predetermined portion of a cover 423.

The elastically deformable portion 423b forms part of the cover 423 that can be elastically deformed. When the wind is introduced to the cover 423 through wind inlet holes 423a and 423b, which act as entrances of the cover 423, the elastically deformable portion 423b is deformed outward to expand due to the pressure of the wind, thereby increasing the inner space of the cover 423 in which the air is contained.

In this state, when the introduction of the wind from the outside through the wind inlet holes 423a and 423b is reduced, the elastically deformable portion 423b is restored by its own restoring force to return to its original state. In this returning process, the air, which has been contained inside the cover 423 due to the deformation in which the elastically deformable portion 423b is stretched, is pushed and is supplied to an inside of the cover 423. Consequently, the wind can be continuously supplied to the rotary blade assembly inside the cover 423, so that the rotary blade assembly can rotate continuously.

Figure 43:
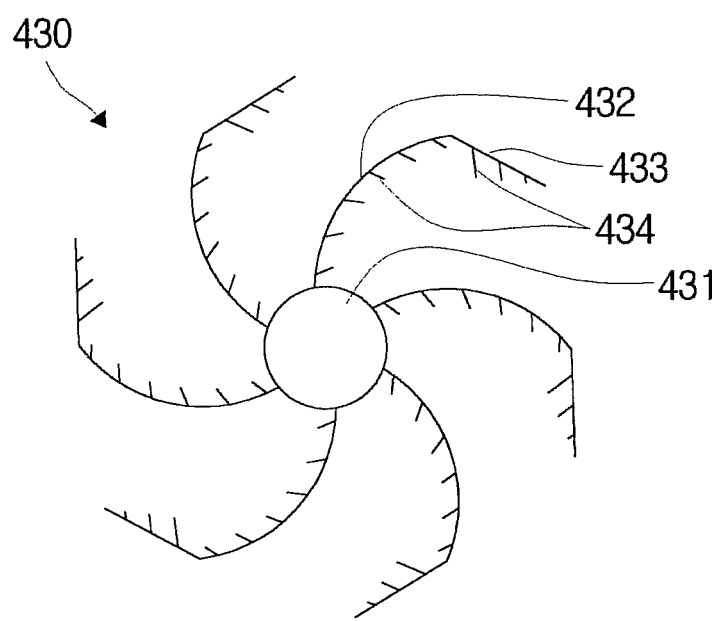
FIG. 43 is a view showing a rotary blade, which is applied to a rotor unit of a wind power converting apparatus according to a thirty-fourth embodiment of the present invention.

FIG. 43 is a view showing a rotary blade, which is applied to a rotor unit of a wind power converting apparatus according to a thirty-fourth embodiment of the present invention.

Referring to FIG. 43, in a rotor unit 430 of this embodiment, rotary blades 432 extend from a rotary shaft 431, and a plurality of auxiliary blades 434 protrude from respective rotary blades 432. A bent blade 434 is formed on the terminal of each rotary blade 432, bent at a predetermined angle from the terminal of the rotary blade 432.

The rotary blade 432 is configured such that it extends from the rotary shaft 431 and is curved at a predetermined curvature. The bent blade 434, which extends from the terminal of the rotary blade 432, is bent in the direction in which the rotary blade 432 is curved, at an angle that is relatively greater than the curvature of the rotary blade 432.

A plurality of auxiliary blades 434 may be formed on the bent blade 434.

Since the bent blades 434 are formed as described above, the area of the rotor unit 430 that can be exposed to the wind is increased, thereby increasing the operating efficiency of the rotor unit 430.

Figure 44:
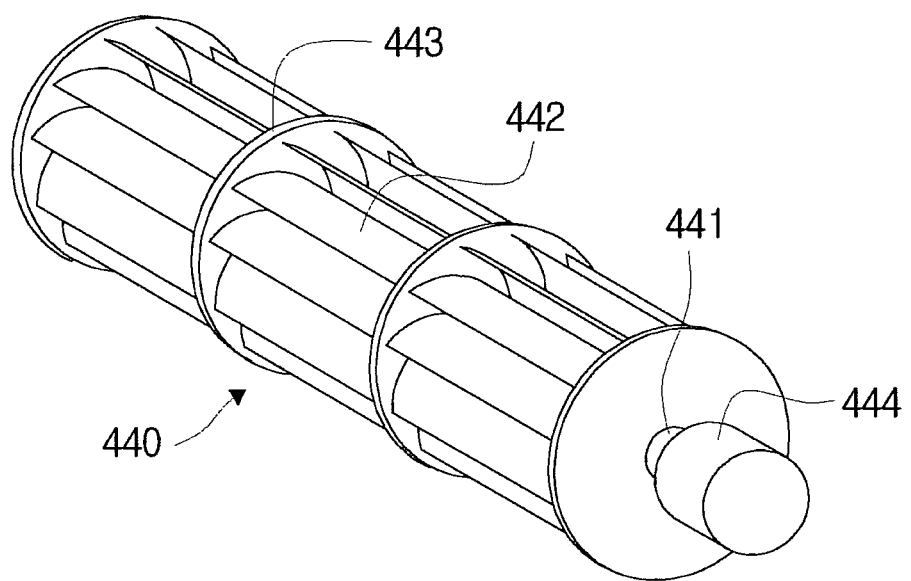
FIG. 44 is a view showing a rotary blade, which is applied to a rotor unit of a wind power converting apparatus according to a thirty-fifth embodiment of the present invention.

FIG. 44 is a view showing a rotary blade, which is applied to a rotor unit of a wind power converting apparatus according to a thirty-fifth embodiment of the present invention.

Referring to FIG. 44, in a rotor unit 440 of this embodiment, a drive motor 444 is disposed on a rotary shaft 441 to which rotary blades 442 are attached.

The drive motor 444 may be provided in various positions, such as a terminal of the rotary shaft 441, a predetermined point in the middle portion of the rotary shaft 441, or the like.

The drive motor 444 is connected to an outside power source (not shown) to rotate the rotary shaft 441. As an example, when the rotor unit 440 is applied to an automobile, the drive motor 444 can operate by being electrically connected to the battery of the automobile.

Since the drive motor 444 is disposed on the rotary shaft 441 to which the rotary blades 442 are attached as described above, the drive motor 444 can be actuated to rotate the rotary shaft 441, for example, when the wind is weak.

Figure 45:
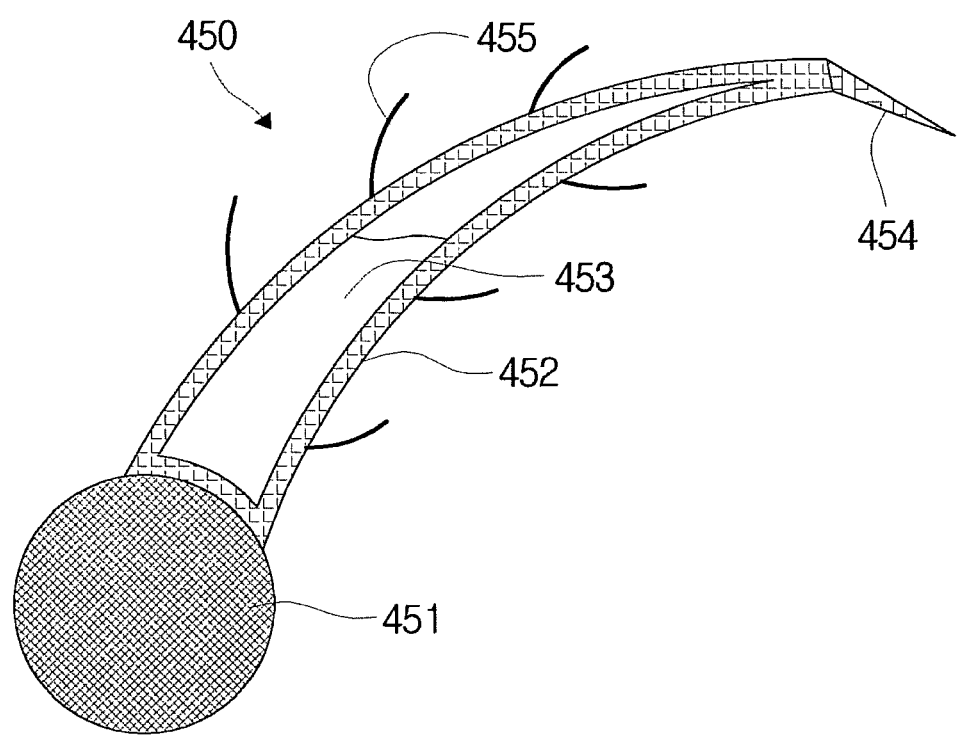
FIG. 45 is a cross-sectional view showing part of a rotary blade, which is applied to a rotor unit of a wind power converting apparatus according to a thirty-sixth embodiment of the present invention.

FIG. 45 is a cross-sectional view showing part of a rotary blade, which is applied to a rotor unit of a wind power converting apparatus according to a thirty-sixth embodiment of the present invention.

Referring to FIG. 45, in a rotor unit 450 of this embodiment, a rotary blade 452 has defined an inner space, which is sealed from the outside, and a working fluid 453 is contained in the sealed inner space of the rotary blade 452.

A predetermined amount of the working fluid 453 may be contained in the inner space of the rotary blade 452 and air or the like may be contained in the remainder of the inner space, such that the working fluid 453 can flow in the inner space of the rotary blade 452.

Since the working fluid 453 is contained in the inner space of the rotary blade 452, which is sealed from the outside, as described above, when the rotary blade 452 is rotated by the wind from the outside, the working fluid 453 can flow inside the rotary blade 452 to increase the rotational inertia the rotary blade 452, so that the rotary blade 452 can rotate continuously and stably.

Reference numeral 454 indicates a weight, which is provided on the terminal of the rotary blade 452 in order to increase the rotational force of the rotary blade 452. The weight 454 may have the form of a blade, which is bent from the terminal of the rotary blade 452, in order to further increase of the rotational force of the rotary blade 452.

Figure 46:
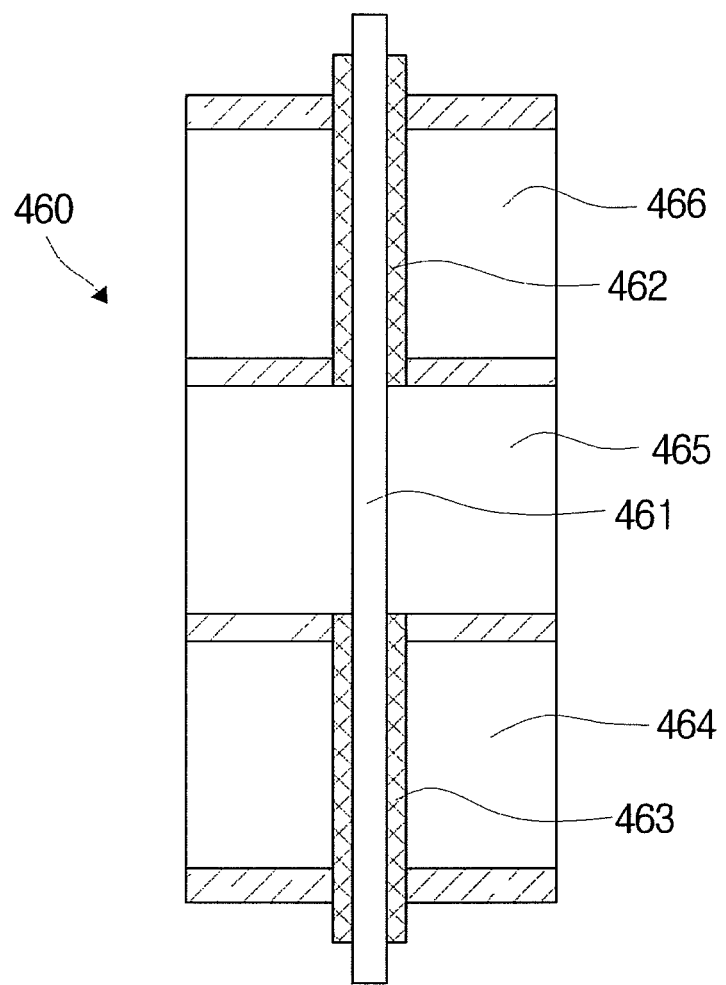
FIG. 46 is a cross-sectional view showing a rotary blade, which is applied to a rotor unit of a wind power converting apparatus according to a thirty-seventh embodiment of the present invention.

FIG. 46 is a cross-sectional view showing a rotary blade, which is applied to a rotor unit of a wind power converting apparatus according to a thirty-seventh embodiment of the present invention.

Referring to FIG. 46, in a rotor unit 460 of this embodiment, a plurality of rotary blades 464, 465 and 466 are provided on a rotary shaft 461.

Reference numerals 462 and 463 are rotary shaft bearings, which surround the rotary shaft 461. The bearings 462 and 463 are configured such that they are separated from each other so that they can rotate independently from each other on the rotary shaft 461. The rotary shaft bearings 462 and 463 can freely rotate relative to the rotary shaft 461.

Some rotary blades 464 and 466 of the multiple rotary blades 464, 465 and 466 are coupled to respective rotary shaft bearings 462 and 463, such that they rotate together with the respective rotary shaft bearings 462 and 463. The other rotary blade 465 of the multiple rotary blades 464, 465 and 466 is coupled to the rotary shaft 461, such that it rotates together with the rotary shaft 461.

The rotary shaft 461 may be directly connected to the shaft of a generator (not shown), and the rotary shaft bearings 462 and 463 may be connected to another generator (not shown) via a gear or the like. As an example, the rotary shaft bearings 462 and 463 may have gear teeth formed on the outer circumference thereof, which can be engaged with gear teeth formed on the rotary shaft of another generator.

With the configuration as described above, the multiple rotary blades 464, 465 and 466 can be rotated independently from each other by the wind from the outside, and the rotary shaft 461 and the rotary shaft bearings 462 and 463 can be connected to different generators, so that electricity can be separately supplied to respective places which use the electricity.

Figure 47:
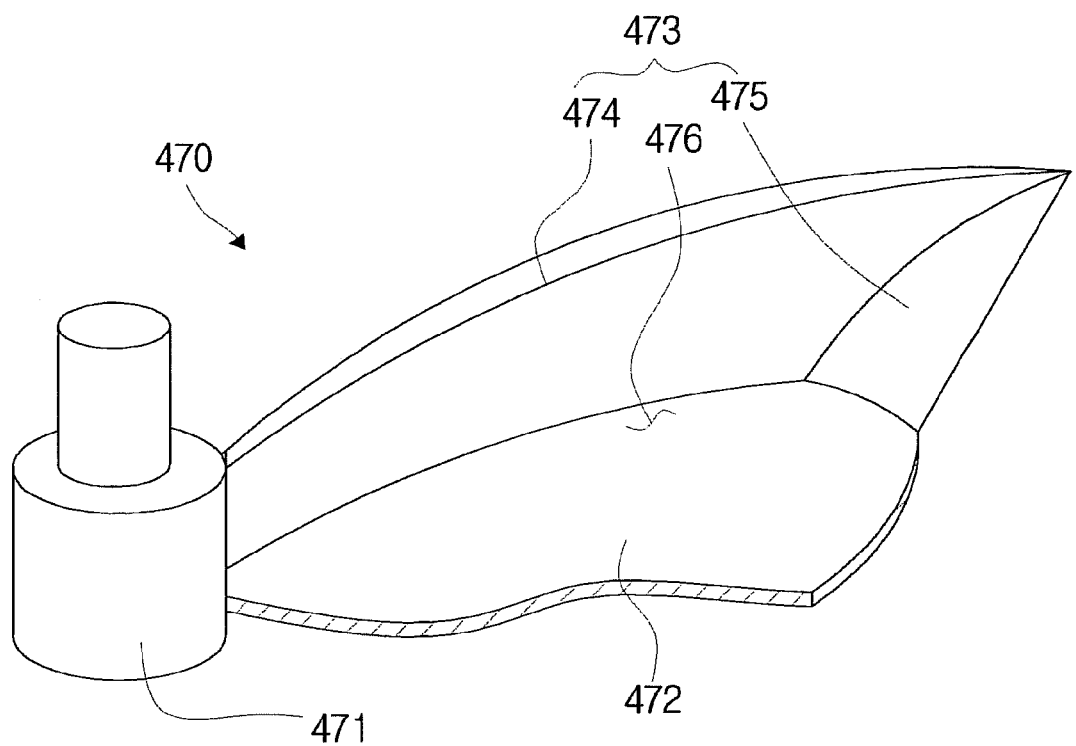
FIG. 47 is a view showing part of a rotary blade, which is applied to a rotor unit of a wind power converting apparatus according to a thirty-eighth embodiment of the present invention.

FIG. 47 is a view showing part of a rotary blade, which is applied to a rotor unit of a wind power converting apparatus according to a thirty-eighth embodiment of the present invention.

Referring to FIG. 47, in a rotor unit 470 of this embodiment, a partition plate 472 extends from a rotary shaft 471.

The partition plate 472 divides the rotary blade into a plurality of sections, such that the rotary blade forms a multi-stage structure.

In this embodiment, a partition plate blade 473 is formed on the partition plate 472.

The partition plate blade 473 protrudes from the surface of the partition plate 472, such that it can be exposed to the wind independently from the rotary blade, thereby increasing the rotational force of the rotor unit 470.

The partition plate blade 473 includes a partition plate blade body 474 and a partition plate blade sub-body 475.

The partition plate blade body 474 may be configured such that it has a variation in height. For example, as shown in the figure, the height of the body 474 may gradually increase in the direction from the rotary shaft 471 toward the periphery of the partition plate 472. In contrast, the height of the body 474 may gradually decrease in the direction from the rotary shaft 471 toward the periphery of the partition plate 472. Of course, various other shapes, in which the height changes in the direction from the rotary shaft 471 toward the periphery of the partition plate 472, may also be presented.

In addition, as shown in the figure, the partition plate blade body 474 has a curved shape, i.e. a shape that is produced by cutting a portion of a globular shape, and the partition plate blade sub-body 475 is configured such that it is bent from the partition plate blade body 474.

As configured above, the partition plate blade body 474 and the partition plate blade sub-body 475 define a wind-receiving hole 476. Since the wind is received in the wind-receiving hole 476, the partition blade 473 can be efficiently rotated.

Figure 48:
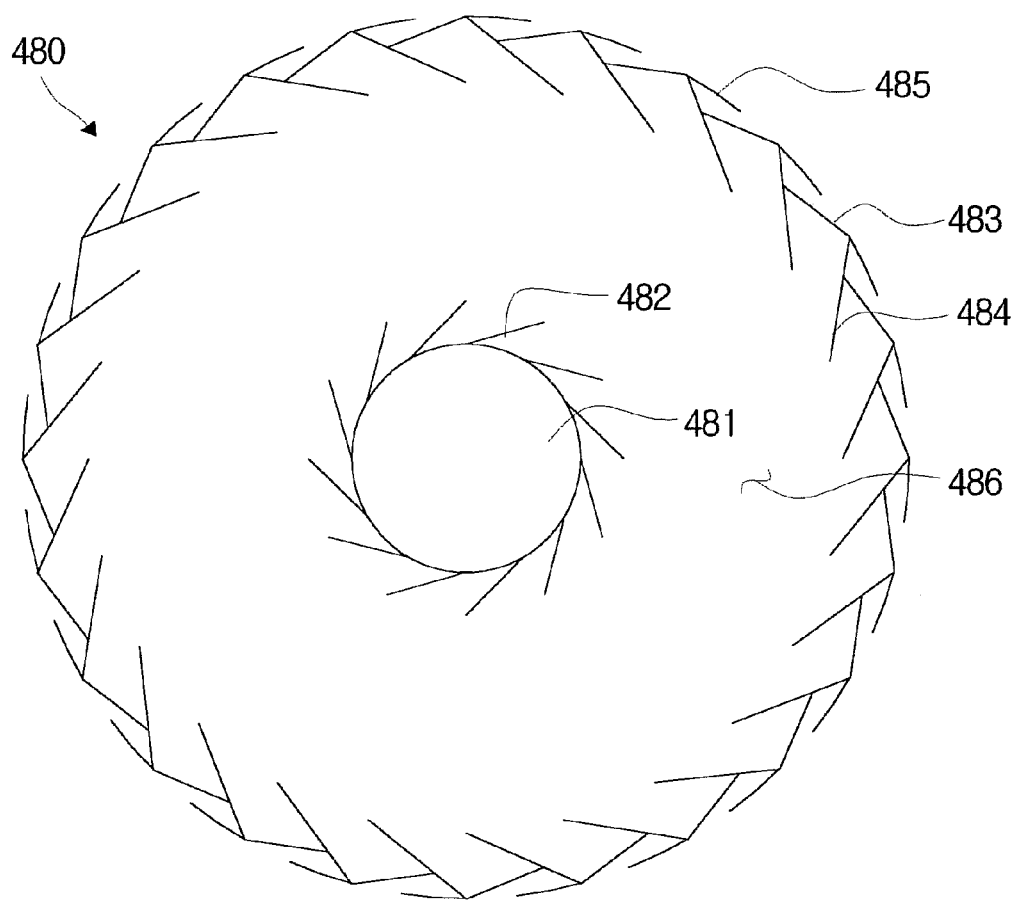
FIG. 48 is a view showing a rotary blade, which is applied to a rotor unit of a wind power converting apparatus according to a thirty-ninth embodiment of the present invention.

FIG. 48 is a view showing a rotary blade, which is applied to a rotor unit of a wind power converting apparatus according to a thirty-ninth embodiment of the present invention.

Referring to FIG. 48, in a rotor unit 480 of this embodiment, a plurality of rotary blades 482 extends from a rotary shaft 481, and a plurality of rotary blades is formed on the periphery of the rotor unit 480, which is connected to the shaft 481 via a partition plate or the like.

The rotary blades may be configured as a multi-stage structure by the partition plate, and at least a portion thereof may be opened such that the wind can also be introduced to the rotary blades 482 or the like.

The rotary blades 482 are configured such that they are laid in one direction, i.e., in the clockwise direction with respect to the viewing direction.

Each of the rotary blades includes an inner rotary blade 484, which extends inward, i.e. toward the rotary blades 482, from a rotary blade body 483, and an outer rotary blade 485, which extends outward from the rotary blade body 483.

The inner rotary blade 484 is laid in the same direction as the rotary blades 482.

When the rotary blades 482 and the inner rotary blade 484 configured as above are exposed to the wind from the outside, they rotate the rotor unit 480. The outer rotary blades 485 also rotate the rotor unit 480 when they are exposed to the wind from the outside. Accordingly, the rotational force of the rotor unit 480 can be increased.

Figure 49:
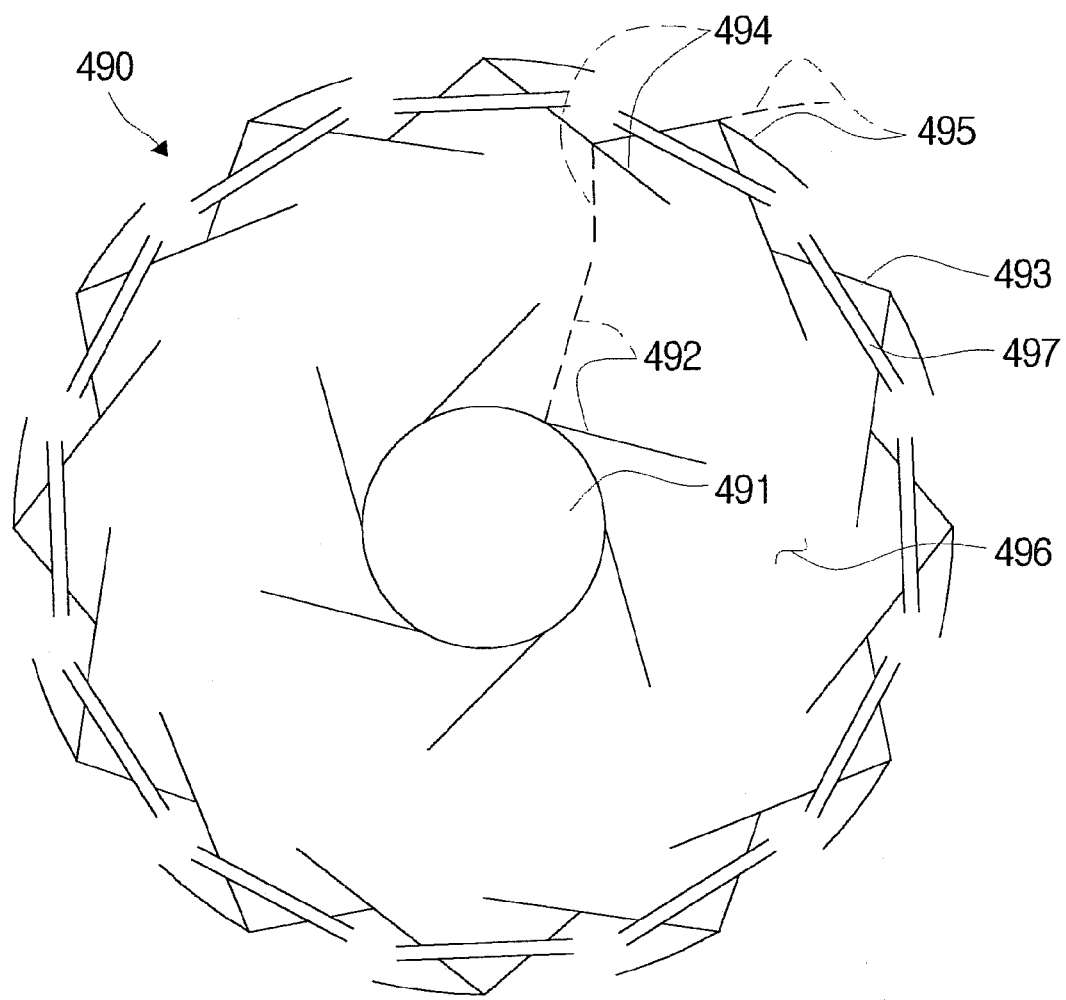
FIG. 49 is a view showing a rotary blade, which is applied to a rotor unit of a wind power converting apparatus according to a fortieth embodiment of the present invention.

FIG. 49 is a view showing a rotary blade, which is applied to a rotor unit of a wind power converting apparatus according to a fortieth embodiment of the present invention.

Referring to FIG. 49, a rotor unit 490 of this embodiment is configured similar to the rotor unit 480, which was previously described in the thirty-ninth embodiment with reference to FIG. 48, except for the following features.

In this embodiment, a plurality of rotary shaft blades 492 extends from a rotary shaft 491. The rotary shaft blades 492 are coupled to the rotary shaft 491 via hinges or the like, such that they can pivot at a predetermined angle.

In addition, a plurality of inner rotary blades 494 extends from respective rotary blade bodies 493 of the rotary blades. The inner rotary blades 494 are coupled to the respective rotary blade bodies 493 via hinges or the like, such that they can pivot at a predetermined angle.

In addition, a plurality of outer rotary blades 495 extends from respective rotary blade bodies 493 of the rotary blades. The outer rotary blades 495 are coupled to the respective rotary blade bodies 493 via hinges or the like, such that they can pivot at a predetermined angle.

Stoppers (not shown) or the like may be provided on the partition plate or the rotary blade bodies 493, so as to limit the pivoting ranges of the rotary shaft blades 492, the inner rotary blades 494 and the outer rotary blades 495.

In FIG. 49, solid lines indicate the state in which the rotary blades 492 and the inner rotary blades 494 pivot in the direction in which they move away from each other, and dotted lines indicate the state in which the rotary blades 492 and the inner rotary blades 494 pivot in the direction in which they become closer to each other.

In FIG. 49, the solid lines indicate the state in which the outer rotary blades 495 pivot in the direction in which they become closer to the rotary blade bodies 493, and the dotted lines indicated the state in which the outer rotary blades 495 pivot in the direction in which they move away from the rotary blade bodies 493.

When the rotary shaft blades 492 and the inner rotary blades 494 pivot in the direction in which they move away from each other and the outer rotary blades 495 pivot in the direction in which they become closer to the rotary blade bodies 493, these blades are almost free from the influence of the wind. When the rotary shaft blades 492 and the inner rotary blades 494 pivot in the direction in which they become closer to each other and the outer rotary blades 495 pivot in the direction in which they move away from the rotary blade bodies 493, these blades are pushed by the wind, thereby causing the rotor unit 490 to rotate. Accordingly, the rotation of the rotor unit 490 can be controlled depending on the direction of the wind.

In addition, in this embodiment, wind flow pipes 497, which extend through respective rotary blade bodies 493, are formed. Wind flow holes having the form of holes may also be formed in place of the wind flow pipes 497.

Since the wind flow pipes 497 are formed as described above, the wind blowing toward one outer rotary blade 495 can be introduced toward an adjacent outer rotary blade 495 through a corresponding wind flow pipe 497, thereby increasing the rotational force of the rotor unit 490.

Although a single rotary shaft blade 402, a single inner rotary blade 494 and a single outer rotary blade 495 are shown as pivoting in FIG. 49, this is for the sake of convenient illustration and explanation only. It is, of course, possible for the other rotary shaft blades 402, the other inner rotary blades 494 and the other outer rotary blades 495 to pivot in the same fashion.

Figure 50:
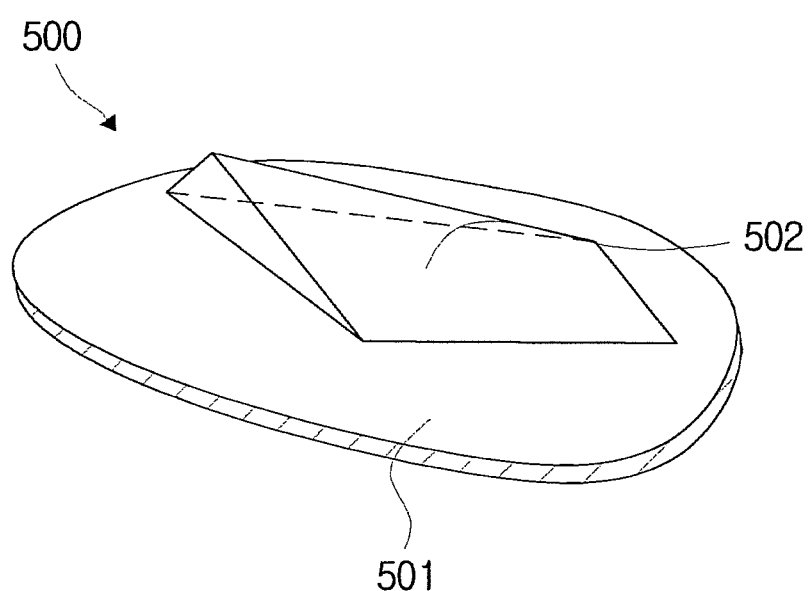
FIG. 50 is a view showing part of a rotary blade, which is applied to a rotor unit of a wind power converting apparatus according to a forty-first embodiment of the present invention.

FIG. 50 is a view showing part of a rotary blade, which is applied to a rotor unit of a wind power converting apparatus according to a forty-first embodiment of the present invention.

Referring to FIG. 50, a rotor unit 500 of this embodiment is configured similar to the rotor unit 490, which was previously described in the fortieth embodiment with reference to FIG. 49, except for the following features.

In this embodiment, a wind guide 502 is provided on a partition plate 501.

The wind guide 502 is inclined toward an inner rotary blade such that the wind that flows over the partition plate 501 is guided toward the inner rotary blade. As an example, as shown in the figure, when the wind guide 502 has a flat rectangular surface, two corners in the leeward side have the same height as or a similar height to that of the partition plate 501, one of the remaining two corners that faces the inner rotary blade has the same height as or a similar height to that of the partition plate 501, and the other one of the remaining two corners protrudes a predetermined height from the partition plate 501, such that an inclined plane is defined by the vertices of the corners. That is, the inclined plane that is defined by the vertices of the corners is oriented toward the inner rotary blade.

With the configuration as described above, the wind that flows over the partition plate 501 is introduced toward the inner rotary blade when it is passing by the wind guide 502, the rotational force of the rotor unit 500 can be increased.

Figure 51:
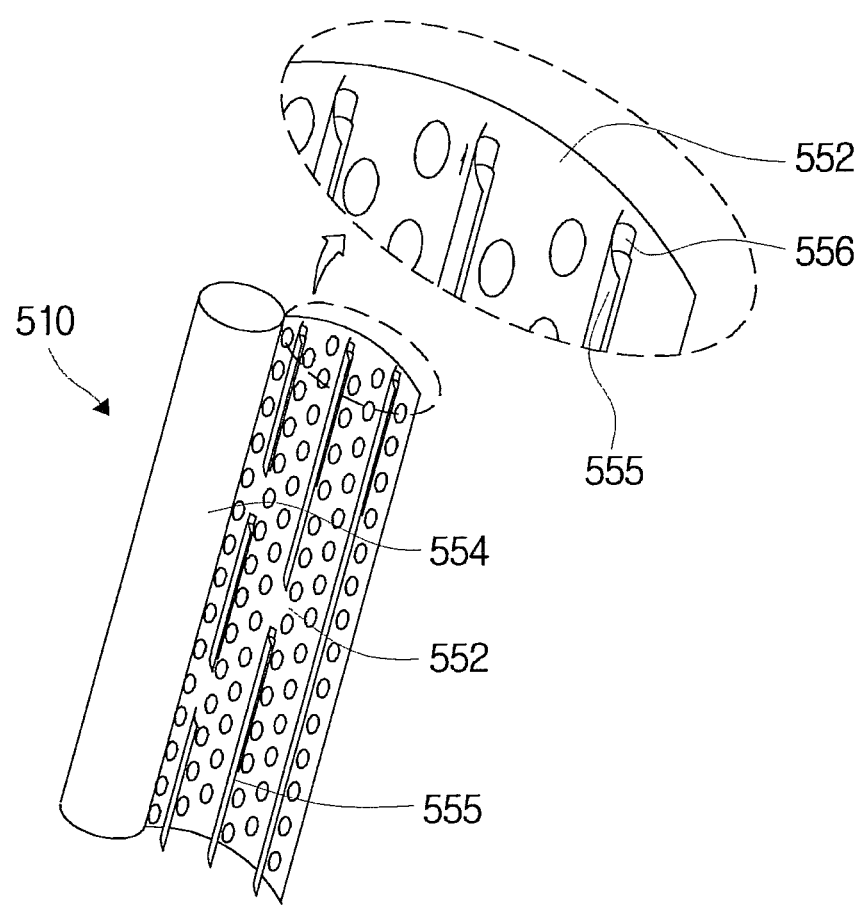
FIG. 51 is a perspective view showing a rotary blade, which is applied to a rotor unit of a wind power converting apparatus according to a forty-second embodiment of the present invention.

FIG. 51 is a perspective view showing a rotary blade, which is applied to a rotor unit of a wind power converting apparatus according to a forty-second embodiment of the present invention.

Referring to FIG. 51, in this embodiment, a rotor unit 510 includes a rotary shaft 554, rotary blades 552 and auxiliary blades 555.

Each rotary blade 552 extends in a curve from the rotary shaft 554.

The auxiliary blades 555 protrude from the surface of the rotary blade 552 in order to increase the rotational force of the rotary blade 552 using the wind that is introduced thereto from the outside. The direction in which the auxiliary blades 555 protrude may be set at an acute angle with respect to the surface of the rotary blade 552. The auxiliary blades 555 may have a width that is the same as that of the rotary blade 552, or may be formed in a structure in which they are divided into a plurality of pieces.

In this embodiment, piece blades 556 are formed on each auxiliary blade 555. A plurality of piece blades 556 are formed on the auxiliary blade 555, such that they increase the rotational force of the rotary blade 552 when they are exposed to the wind that blows from the outside.

The piece blades 556 may further have through-holes (not shown) like the through-holes 205*a*, 206*a* and 207*a*, which are formed in the respective piece blades 205, 206 and 207, as shown in FIG. 16, such that the wind can pass through the piece blades. At least one of the through pipes, which are shown in and described with reference to respective FIG. 17 to FIG. 21, may further be formed in the piece blades 556. Here, descriptions of some features will be omitted, since they are identical to those which were described with reference to FIG. 16 to FIG. 21.

Since the piece blades 556 are additionally provided as described above, the resistance to the wind can be increased, such that the rotational force of the rotor unit 510 is increased, thereby increasing the operating efficiency.

While the present invention has been shown and described with reference to certain exemplary embodiments thereof, it will be understood by those skilled in the art that various changes and variations may be made therein without departing from the spirit and scope of the present invention as defined by the appended claims and their equivalents. It should be understood, however, that all such changes and variations fall within the scope of the present invention.

INDUSTRIAL APPLICABILITY

According to aspects of the present invention, the operating efficiency of the wind power converting apparatus can be increased. Therefore, it will be apparent that has the present invention has prominent industrial applicability.

The invention claimed is:

1. A wind power converting apparatus comprising:
a rotary blade assembly having a rotary blade disposed in a longitudinal direction of a rotary shaft, the rotary blade assembly being rotated by wind from an outside, wherein the rotary blade assembly comprises the rotary shaft and a plurality of the rotary blades extending from the rotary shaft; and
rotary shaft bearings disposed to surround the rotary shaft, wherein the rotary shaft bearings are configured such that the rotary shaft bearings are separated from each other so as to rotate independently from each other on the rotary shaft,
wherein some of the rotary blades are coupled to the rotary shaft bearings, such that the some rotary blades rotate together with the rotary shaft bearings, and the others of the rotary blades are coupled to the rotary shaft, such that the other rotary blades rotate together with the rotary shaft.

2. A wind power converting apparatus comprising:
a rotary blade assembly having a rotary blade disposed in a longitudinal direction of a rotary shaft, the rotary blade assembly being rotated by wind from an outside, wherein the rotary blade assembly comprises the rotary shaft from which a rotary shaft blade extends, the rotary blade extending from the rotary shaft and including an inner rotary blade extending from a rotary blade body to the rotary shaft blade, and a partition plate, the partition plate dividing the rotary blade into a plurality of sections, such that the rotary blade forms a multi-stage structure; and
a wind guide inclined toward the inner rotary blade such that wind that flows over the partition plate is guided toward the inner rotary blade.

3. A wind power converting apparatus comprising a rotor unit, wherein the rotor unit further comprises:
a rotary blade assembly comprising a rotary blade disposed in a longitudinal direction of a rotary shaft, the rotary blade assembly being rotated by wind from an outside;
an auxiliary blade protruding from a surface of the rotary blade assembly, the auxiliary blade increasing a rotational force of the rotary blade assembly by the wind introduced from the outside;
an outer cover surrounding the rotary blade assembly; and
an inner cover disposed between the outer cover and the rotary blade assembly,
wherein an area between the outer cover and the rotary blade assembly is partitioned by the inner cover, thereby forming a plurality of wind inlet holes, through which wind is introduced to different parts of the rotary blade assembly.

4. A wind power converting apparatus comprising:
a rotary blade assembly having a rotary blade disposed in a longitudinal direction of a rotary shaft, the rotary blade assembly being rotated by wind from an outside, wherein the rotary blade assembly comprises the rotary shaft, the rotary blade extending from the rotary shaft, and a partition plate, the partition plate dividing the rotary blade into a plurality of sections, such that the rotary blade forms a multi-stage structure; and
a partition plate blade protruding from the partition plate, wherein the partition plate blade is exposed to wind independently from the rotary blade, thereby increasing a rotational force of the rotor unit;
a partition plate blade body having a curved shape, which is produced by cutting a portion of a globular shape, with a height of the partition plate blade body varying in a direction from the rotary shaft to a periphery of the partition plate; and
a partition plate blade sub-body configured to be bent from the partition plate blade body.

5. A wind power converting apparatus comprising:
a rotary blade assembly having a rotary blade disposed in a longitudinal direction of a rotary shaft, the rotary blade assembly being rotated by wind from an outside, wherein the rotary blade assembly comprises the rotary shaft and the rotary blade extending from the rotary shaft,
wherein an inner space, which is sealed from an outside, is formed inside the rotary blade, and a working fluid contained in the sealed inner space of the rotary blade, the working fluid flowing inside the rotary blade when the rotary blade is rotated by the wind from the outside, thereby increasing a rotational inertia of the rotary blade.

6. A wind power converting apparatus comprising:
a rotary blade assembly comprising a rotary blade, which are provided in a longitudinal direction of a rotary shaft, the rotary blade assembly being rotated by wind from an outside;
a cover, wherein the cover blocks a headwind, which blows opposite to a direction in which the rotary blade assembly is rotated, from being introduced to the rotary blade assembly; and
an elastically deformable portion formed in the cover, wherein,
when the wind is introduced to the cover from the outside, the elastically deformable portion is deformed outward by a pressure of the wind, thereby increasing an inner space of the cover in which air is contained, and
when introduction of the wind into the cover is reduced, the elastically deformable portion is restored to an original state, so that the air, which has been contained inside the cover by deformation and stretching of the elastically deformable portion, is pushed and is supplied to an inside of the cover.

7. A wind power converting apparatus comprising:
a rotary blade assembly having a rotary blade provided in a longitudinal direction of a rotary shaft, the rotary blade assembly being rotated by wind from an outside;
an auxiliary blade protruding from a surface of the rotary blade assembly, the auxiliary blade increasing a rotational force of the rotary blade assembly by the wind introduced from the outside; and a piece blade formed on the auxiliary blade, the piece blade increasing the rotational force of the rotary blade assembly by the wind introduced from the outside.

8. A wind power converting apparatus comprising a rotor unit, wherein the rotor unit further comprises:
a rotary blade assembly comprising a rotary blade disposed in a longitudinal direction of a rotary shaft, the rotary blade assembly being rotated by wind from an outside; and
an auxiliary blade protruding from a surface of the rotary blade assembly, the auxiliary blade increasing a rotational force of the rotary blade assembly by the wind introduced from the outside,
wherein the rotor unit further comprises a cover, wherein a thickness of the cover changes in a direction from an inlet hole side, through which the wind from the outside is introduced to the rotary blade assembly, to an outlet hole side, through which the wind from the outside that has passed through the rotary blade assembly is exhausted.

9. A wind power converting apparatus comprising:
a rotary blade assembly having a rotary blade disposed in a longitudinal direction of a rotary shaft, the rotary blade assembly being rotated by wind from an outside, wherein the rotary blade assembly comprises the rotary shaft and the rotary blade extending from the rotary shaft; and
a rotary shaft blade extending from the rotary shaft, wherein the rotary blade comprises:
a rotary blade body;
an inner rotary blade extending from the rotary blade body to the rotary shaft blade; and
an outer rotary blade extending outward from the rotary blade body.

10. The wind power converting apparatus of claim 9, wherein the rotary shaft blade is pivotably coupled to the rotary shaft, and the inner rotary blade is pivotably coupled to the rotary blade body.

11. A wind power converting apparatus comprising a rotor unit, wherein the rotor unit comprises:
a rotary blade assembly comprising a rotary blade disposed in a longitudinal direction of a rotary shaft, the rotary blade assembly being rotated by wind from an outside;
a cover, wherein the cover blocks a headwind, which blows opposite to a direction in which the rotary blade assembly is rotated, from being introduced to the rotary blade assembly,
wherein the rotary blade assembly comprises a plurality of the rotary blades extending from the rotary shaft and at least one partition plate disposed along the rotary shaft, the partition plate dividing each of the rotary blades into a plurality of sections, such that the rotary blade forms a multi-stage structure,
wherein a plurality of partitioned spaces is formed inside the partition plate, liquid is disposed inside the partitioned spaces, a plurality of resistant fins protrudes into each of the partitioned spaces from an outer circumference the each partitioned space, and
wherein, when the partition plate rotates, the liquid is collected in one portion of the each partitioned space, and when a rotational force of the partition plate decreases, the liquid is collected in the other portion of the each partitioned space due to inertia to collide against the resistant fins, thereby increasing a rotational force of the rotor unit.

12. The wind power converting apparatus of claim 11, wherein the cover rotates about the rotary shaft in a direction in which wind blows.

13. The wind power converting apparatus of claim 11, further comprising a plurality of generators, each of which is connected to the rotary shaft of the rotary blade assembly to generate electricity.

14. The wind power converting apparatus of claim 11, wherein at least one globular weight is contained in the partitioned space.

15. The wind power converting apparatus of claim 11, wherein the cover has a wind guide extending from a body of the cover to guide a favorable wind, which is in a direction in which the rotary blade assembly rotates, to the rotary blade assembly.

16. The wind power converting apparatus of claim 15, wherein a length of the wind guide is variable with respect to the body of the cover.

17. A wind power converting apparatus comprising a rotor unit, wherein the rotor unit comprises:
a rotary blade assembly comprising a rotary blade disposed in a longitudinal direction of a rotary shaft, the rotary blade assembly being rotated by wind from an outside;
an auxiliary blade protruding from a surface of the rotary blade assembly, the auxiliary blade increasing a rotational force of the rotary blade assembly by the wind introduced from the outside,
wherein a plurality of the auxiliary blades have different heights.

18. The wind power converting apparatus of claim 17, wherein the rotary blade assembly comprises a plurality of the rotary blades extending from the rotary shaft and at least one partition plate disposed along the rotary shaft, the partition plate dividing each of the rotary blades into a plurality of sections, such that the rotary blade forms a multi-stage structure.

19. The wind power converting apparatus of claim 17, wherein recesses are formed in at least one of the rotary blade assembly and the auxiliary blade.

20. The wind power converting apparatus of claim 17, wherein the rotor unit further comprises a cover surrounding the rotary blade assembly, the cover having a plurality of wind inlet holes formed in a plurality of directions, wherein the wind from the outside is introduced through the wind inlet holes to the rotary blade assembly.

21. The wind power converting apparatus of claim 17, wherein the rotary blade assembly comprises a plurality of the rotary blades and a plurality of the auxiliary blades formed on each of the rotary blades, wherein a wind outlet is formed in a portion where the rotary blades are coupled to each other, the auxiliary blades are curved at a predetermined curvature, a through-hole is formed in a respective upper end of the curved auxiliary blades, and a screen, which prevents wind from blowing back into the through-hole, is provided.

22. The wind power converting apparatus of claim 17, wherein the rotary blade assembly has a wind resistant portion, with a portion of the wind resistant portion protruding to increase the rotational force of the rotary blade assembly.

23. A wind power converting apparatus comprising a rotor unit, wherein the rotor unit further comprises:
a rotary blade assembly comprising a rotary blade disposed in a longitudinal direction of a rotary shaft, the rotary blade assembly being rotated by wind from an outside; and
an auxiliary blade protruding from a surface of the rotary blade assembly, the auxiliary blade increasing a rotational force of the rotary blade assembly by the wind introduced from the outside,
wherein the rotary blade assembly comprises the rotary blade and a wind guide pipe, which extends through the rotary blade.

24. The wind power converting apparatus of claim 23, wherein the rotary blade assembly comprises an elastic backflow prevention cover, which prevents wind from blowing back in an outlet of the wind guide pipe.

25. The wind power converting apparatus of claim 23, wherein the wind guide pipe is configured to be bent in one direction, and the auxiliary blade is provided on a portion of the wind guide pipe.

26. The wind power converting apparatus of claim 23, wherein the wind guide plate has a spiral shape, which causes resistance to wind that is passing through the wind guide plate, such that the rotational force of the rotary blade assembly is increased.

27. The wind power converting apparatus of claim 23, wherein the rotary blade assembly comprises a conical backflow prevention cover, which prevents wind from blowing back in an outlet of the wind guide pipe, an outlet-side interval-forming member, which forms an interval between the outlet of the wind guide pipe and the backflow prevention cover so as to form an outlet passage for wind between the outlet of the wind guide pipe and the backflow prevention cover, a plate-like backflow prevention cover, which prevents wind from blowing back in an inlet of the wind guide pipe, and an inlet-side interval-forming member, which forms an interval between the backflow prevention cover and the wind guide pipe so as to form an outlet passage for wind between the backflow prevention cover and the wind guide pipe.

28. The wind power converting apparatus of claim 27, wherein the conical backflow prevention cover has a backflow prevention flange extending therefrom.

* * * * *